(12) United States Patent
Seo et al.

(10) Patent No.: US 10,360,375 B2
(45) Date of Patent: Jul. 23, 2019

(54) ELECTRONIC DEVICE FOR EXECUTING APPLICATION AND METHOD OF CONTROLLING SAME

(71) Applicant: Samsung Electronics Co., Ltd., Gyeonggi-do (KR)

(72) Inventors: Young-Su Seo, Gyeonggi-do (KR); Nandeeshwar Kodihalli, Gyeonggi-do (KR); Joon-Ho Park, Gyeonggi-do (KR); Hye-Min Song, Gyeonggi-do (KR); Yu-Jin Jung, Gyeongsangnam-do (KR); Young-Jip Kim, Gyeonggi-do (KR); Tae-Soo Lee, Seoul (KR); Bum-Taek Lim, Gyeonggi-do (KR); Dong-Jin Choi, Gyeonggi-do (KR); Jun-Tae Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 193 days.

(21) Appl. No.: 15/044,858

(22) Filed: Feb. 16, 2016

(65) Prior Publication Data
US 2016/0239659 A1    Aug. 18, 2016

(30) Foreign Application Priority Data
Feb. 16, 2015    (KR) ........................ 10-2015-0023641

(51) Int. Cl.
| G06F 21/53 | (2013.01) |
| G06F 21/51 | (2013.01) |
| G06F 21/44 | (2013.01) |

(52) U.S. Cl.
CPC .............. *G06F 21/53* (2013.01); *G06F 21/44* (2013.01); *G06F 21/51* (2013.01); *G06F 2221/2113* (2013.01)

(58) Field of Classification Search
None
See application file for complete search history.

(56) References Cited

U.S. PATENT DOCUMENTS

| 8,499,304 B2 * | 7/2013 | De Los Reyes | G06F 3/0488 |
| | | | 718/106 |
| 8,666,938 B1 * | 3/2014 | Pancholy | G06F 9/455 |
| | | | 707/610 |

(Continued)

FOREIGN PATENT DOCUMENTS

| KR | 10-2014-0044972 | 4/2014 |
| WO | WO 2008/048320 | 4/2008 |
| WO | WO 2013/137616 | 9/2013 |

OTHER PUBLICATIONS

International Search Report dated May 24, 2016 issued in counterpart application No. PCT/KR2016/001556, 10 pages.

(Continued)

*Primary Examiner* — Trang T Doan
(74) *Attorney, Agent, or Firm* — The Farrell Law Firm, P.C.

(57) ABSTRACT

A electronic device and a control method of the electronic device are provided. A control method includes providing a first environment in which at least one application can operate and a second environment having an operation environment at least partially different from the first environment; determining whether a first application among the at least one application is to be executed in the second environment, when an execution command of the first application is acquired; and executing the first application in the second environment, when it is determined that the first application is to be executed in the second environment.

16 Claims, 32 Drawing Sheets

(56) References Cited

U.S. PATENT DOCUMENTS

| | | | |
|---|---|---|---|
| 9,383,984 B2* | 7/2016 | Mantripragada | G06F 8/60 |
| 9,461,821 B1* | 10/2016 | Machani | H04L 9/0894 |
| 9,553,758 B2* | 1/2017 | Rexer | H04L 29/08666 |
| 9,785,790 B2* | 10/2017 | Regev | G06F 9/4401 |
| 2004/0123109 A1* | 6/2004 | Choi | H04L 9/3239 |
| | | | 713/176 |
| 2007/0234344 A1 | 10/2007 | Hamid et al. | |
| 2008/0189767 A1* | 8/2008 | Kothari | G06F 21/52 |
| | | | 726/4 |
| 2009/0259993 A1* | 10/2009 | Konduri | G06F 11/3664 |
| | | | 717/127 |
| 2010/0024028 A1* | 1/2010 | Baugher | G06F 21/62 |
| | | | 726/17 |
| 2011/0081008 A1 | 4/2011 | Lawson et al. | |
| 2011/0145833 A1 | 6/2011 | De Los Reyes et al. | |
| 2011/0145926 A1* | 6/2011 | Dalcher | G06F 11/3466 |
| | | | 726/26 |
| 2011/0246753 A1 | 10/2011 | Thomas | |
| 2012/0102103 A1 | 4/2012 | Jacobson et al. | |
| 2014/0082690 A1 | 3/2014 | Ju et al. | |
| 2014/0172406 A1 | 6/2014 | Baset et al. | |
| 2014/0181964 A1* | 6/2014 | Park | G06F 21/6209 |
| | | | 726/19 |
| 2014/0229619 A1* | 8/2014 | Han | H04L 67/02 |
| | | | 709/225 |
| 2014/0297587 A1* | 10/2014 | Olsen | G06F 21/64 |
| | | | 707/610 |
| 2014/0298312 A1* | 10/2014 | Plax | G06F 8/65 |
| | | | 717/171 |
| 2015/0347746 A1* | 12/2015 | Martel | G06F 21/53 |
| | | | 726/1 |
| 2015/0347748 A1* | 12/2015 | Krstic | G06F 21/53 |
| | | | 726/1 |

OTHER PUBLICATIONS

European Search Report dated Jun. 23, 2016 issued in counterpart application No. 16155898.6-1870, 6 pages.

* cited by examiner

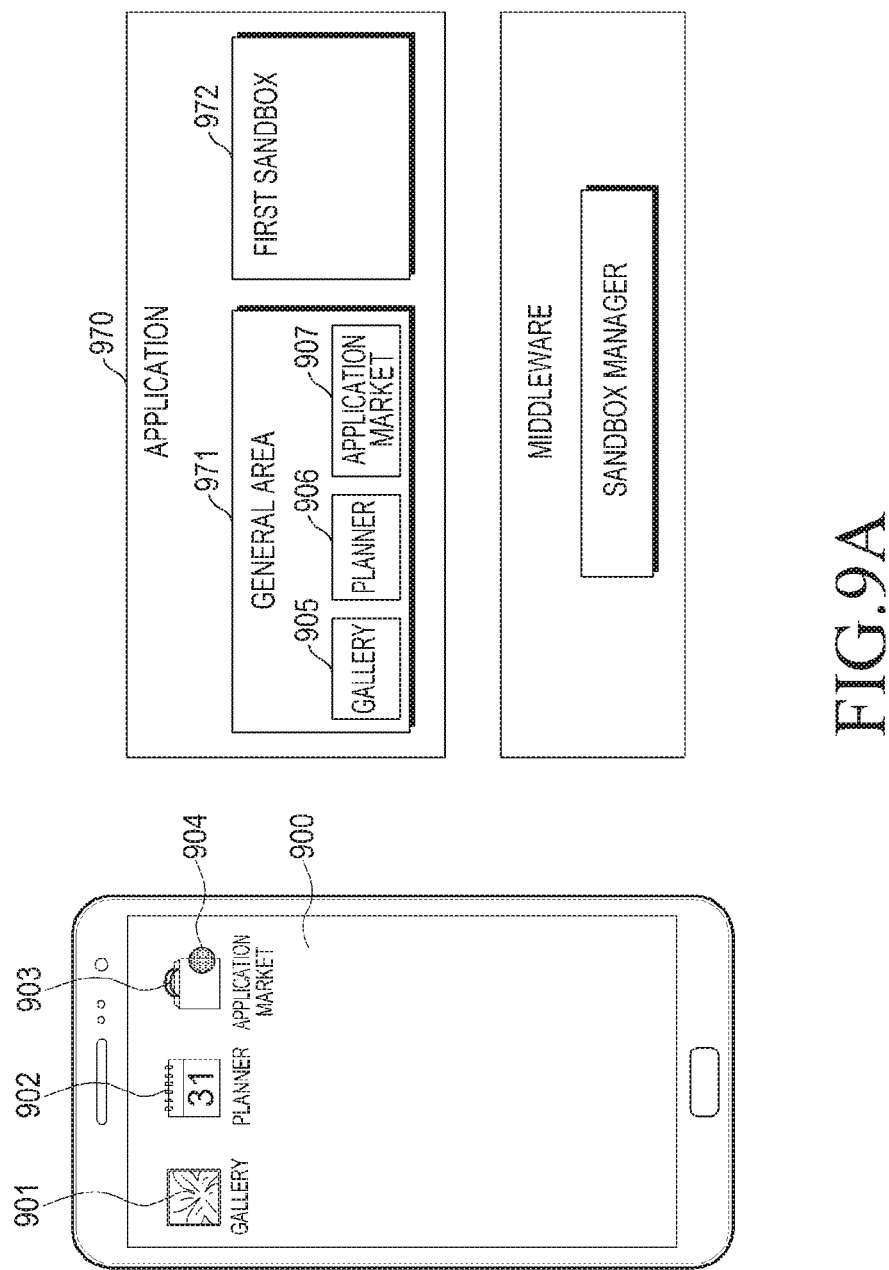

ELECTRONIC DEVICE FOR EXECUTING APPLICATION AND METHOD OF CONTROLLING SAME

PRIORITY

This application claims priority under 35 U.S.C. § 119(a) to Korean Patent Application Serial No. 10-2015-0023641, which was filed in the Korean Intellectual Property Office on Feb. 16, 2015, the entire content of which is incorporated herein by reference.

BACKGROUND

1. Field of the Disclosure

The present disclosure relates generally to an electronic device for executing an application and a method of controlling the same, and more particularly, to an electronic device for downloading, installing, and executing an application, and a method of controlling the same.

2. Description of the Related Art

Mobile terminals provide general telephone functions and additional functions such as an alarm, a Short Messaging Service (SMS), a Multimedia Message Service (MMS), E-mail, games, remote control of short-range communication, an image capturing function using an installed digital camera, a multimedia function for providing audio and video contents, a scheduling function, etc.

Further, mobile terminals may download, install, and execute applications that provide the aforementioned functions or other functions of the mobile terminals. For example, downloadable applications may include a music reproduction application, a video reproduction application, a photo gallery application, a game application, a social networking application, an Internet browsing application, a file management application, a cloud service application, etc.

An Operating System (OS) of a mobile terminal, for example, an Android® OS or another OS, may classify applications to be a group included in a sandbox in order to separate the applications within the sandbox, their respective application data, and code execution of each of these applications from any remaining applications of the mobile terminal in the case of execution or runtime. Accordingly, applications within the sandbox may only be shared with the other applications included in the sandbox.

A sandbox may be configured by a manager having security rights. More particularly, when the manager having the security rights logs in to an OS, the electronic device may include the application in the sandbox based on a command from the manager. That is, the existing sandbox is configured by the manager having the security rights, and there is no current technology in which, when an application is installed, the electronic device determines data related to the application and determines whether to allocate the application to the sandbox.

Consequently, an application developer or an application producer cannot be guaranteed an independent space within the electronic device to install and execute the application, for example, the sandbox.

Accordingly, a need exists for a technology in which an electronic device allocates an application to a sandbox based on data related to the application.

SUMMARY

The present disclosure has been made to solve the aforementioned and other problems and to provide at least the advantages described below.

Accordingly, an aspect of the present disclosure is to provide an electronic device for allocating an application to a sandbox when the application is downloaded and installed, and a control method thereof.

Another aspect of the present disclosure is to provide an electronic device in which an application developer or an application producer can be guaranteed an independent space to install and execute the application, for example, a sandbox or a domain.

Another aspect of the present disclosure is to provide an application including information indicating that the application should be allocated to and executed in a sandbox or a domain, such that ah electronic device can manage the application in the independent space.

Another aspect of the present disclosure is to provide an electronic device with which a user is not required to directly configure a sandbox according to a particular application, and the corresponding application can be allocated to the sandbox when the application is downloaded.

In accordance with an aspect of the present disclosure, an electronic device is provided, which includes an input/output interface; a processor; and a memory that stores instructions, which when executed, instruct the processor to: provide a first environment in which at least one application can operate and a second environment having an operation environment at least partially different from the first environment, determine whether a first application among the at least one application is to be executed in the second environment, when an execution command of the first application is acquired through the input/output interface, and execute the first application in the second environment, when is the processor determines that the first application is to be executed in the second environment.

In accordance with another aspect of the present disclosure, a control method of an electronic device is provided. The control method includes providing a first environment in which at least one application can operate and a second environment having an operation environment at least partially different from the first environment; determining whether a first application among the at least one application is to be executed in the second environment, when an execution command of the first application is acquired; and executing the first application in the second environment, when it is determined that the first application is to be executed in the second environment.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 9A to 9H are conceptual diagrams illustrating screens of an electronic device according to an embodiment of the present disclosure;

DETAILED DESCRIPTION

Figure 1:
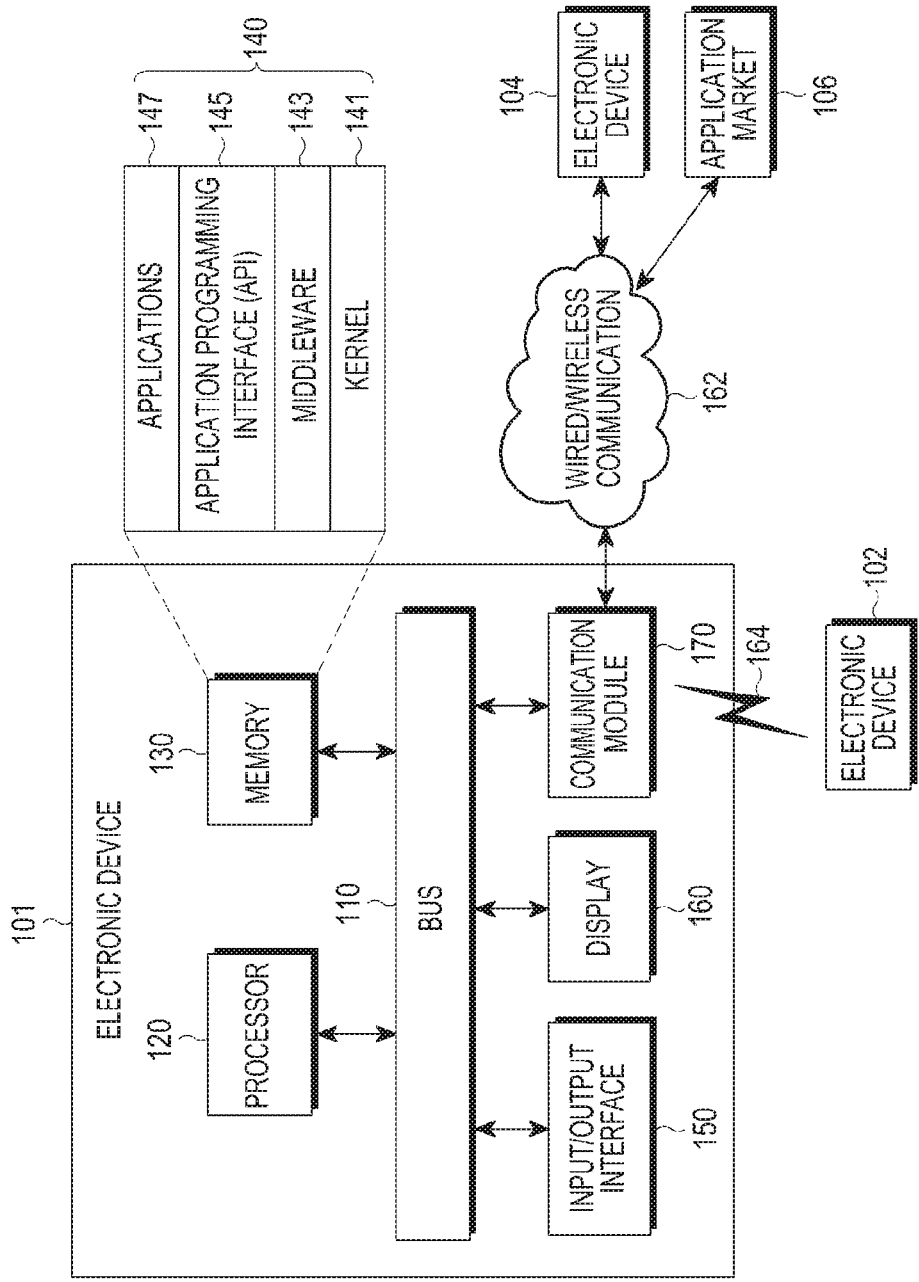
FIG. 1 illustrates a network environment including an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure.

In describing the drawings, similar reference numerals may be used to designate similar elements.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms that are defined in a generally used dictionary are to be interpreted to have the same meanings as the contextual meanings in the relevant field of the art, and are not to be interpreted to have ideal or excessively formal meanings unless clearly defined in the present disclosure. In some cases, even the terms defined in the present disclosure should not be interpreted to exclude embodiments of the present disclosure.

Herein, the expressions "have", "may have", "include", or "may include" refer to the existence of a corresponding feature (e.g., a numeral, a function, an operation, or a constituent element such as a component), and do not exclude one or more additional features.

The expressions "A or B", "at least one of A and/or B", or "one or more of A and/or B" may include any or all possible combinations of items enumerated together. For example, the expressions "A or B", "at least one of A and B", or "at least one of A or B" may include (1) at least one A, (2) at least one B, or (3) both at least one A and at least one B.

Herein, the expressions "a first", "a second", "the first", and "the second" may modify various components regardless of the order and/or the importance, but do not limit the corresponding components. The above expressions may be used merely for the purpose of distinguishing an element from the other elements. For example, a first user device and a second user device may indicate different user devices, although both of the devices are user devices. For example, a first element may be referred to as a second element, and similarly, a second element may be referred to as a first element without departing from the scope of the present disclosure.

When an element (e.g., a first element) is referred to as being (operatively or communicatively) "connected" or "coupled" to another element (e.g., a second element), the first element may be directly connected or coupled to the second element, or any other element (e.g., a third element) may be interposed between the first element and the second element. In contrast, when the first element is referred to as being "directly connected" or "directly coupled" to the second element, there are no elements interposed therebetween.

The expression "configured to" may be exchanged with, for example, "suitable for", "having the capacity to", "designed to", "adapted to", "made to", or "capable of" according to the situation. The term "configured to" does not necessarily imply "specifically designed to" in hardware. Alternatively, in some situations, the expression "a device configured to" may mean that the device, together with other devices or components, "is able to".

For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

An electronic device herein may include a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, a wearable device (e.g., a head-mounted-device (HMD) such as electronic glasses, electronic clothes, an electronic bracelet, an electronic necklace, an electronic appcessory, electronic tattoos, or a smart watch), etc.

Further, the electronic device may also be a smart home appliance, such as a television (TV), a Digital Video Disk (DVD) player, an audio device, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

The electronic device may also include at least one of various medical devices (e.g., various portable medical measuring devices, such as a blood glucose monitoring device, a heart rate monitoring device, a blood pressure measuring device, a body temperature measuring device, etc., a Magnetic Resonance Angiography (MRA) device, a Magnetic Resonance Imaging (MRI) device, a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics devices, security devices, an automotive head unit, a robot for home or industry, an automatic teller machine (ATM), a point of sales (POS) device in a shop, or an Internet of things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.).

The electronic device may also include a part of furniture or a building/structure, an electronic board, an electronic signature receiving device, a projector, and/or various kinds of measuring instruments (e.g., a water meter, an electric meter, a gas meter, and a radio wave meter).

The electronic device may also be a flexible device.

The electronic device may be a combination of one or more of the aforementioned various devices.

However, the electronic device described herein is not limited to the aforementioned example devices, and may include a new or different electronic device according to new technologies.

Herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, an electronic device 101 includes a bus 110, a processor 120, a memory 130, an input/output interface 150, a display 160, and a communication interface 170. Alternatively, the electronic device 101 may omit at least some of the illustrated elements or further include other elements.

The bus 110 may include a circuit for connecting the elements 120 to 170 and transmitting communication (for example, control messages and/or data) between the elements 120 to 170.

The processor 120 may include one or more of a CPU, an AP, and a Communication Processor (CP). The processor 120 may control one or more of the elements 130 to 170 of the electronic device 101 and/or process an operation or data related to communication. The processor 120 may be referred to as a controller or may include a controller as a part thereof.

The memory 130 may include a volatile memory and/or a non-volatile memory. The memory 130 may store instructions or data related to at least one other element of the electronic device 101. The memory 130 stores software and/or a program 140. The program 140 includes a kernel 141, middleware 143, an Application Programming Interface (API) 145, and an application program (or "application") 147. At least some of the kernel 141, the middleware 143, and the API 145 may be referred to as an OS.

For example, the kernel 141 may control or manage system resources (for example, the bus 110, the processor 120, and the memory 130) that are used to execute an operation or a function implemented in the other programs (for example, the middleware 143, the API 145, and the application 147). Further, the kernel 141 may provide an interface through which the middleware 143, the API 145, or the application 147 may access individual elements of the electronic device 101 to control or manage system resources.

The middleware 143 may serve as an intermediary such that, for example, the API 145 or the application 147, communicates with the kernel 141 to transmit/receive data. Further, in relation to requests for an operation received from the application 147, the middleware 143 may control (for example, perform scheduling or load-balancing) the requests for the operation by determining a sequence for using system resources of the electronic device 101 with respect to at least one application among the application 147.

The API 145 is an interface by which the applications 147 control functions provided from the kernel 141 or the middleware 143, and may include at least one interface or function (for example, instructions) for file control, window control, image processing, and/or text control.

Herein, the applications 147 may also be referred to as application programs.

The input/output interface 150 may serve as an interface that transmits commands or data input from the user or another external device to other elements of the electronic device 101. Further, the input/output interface 150 may output commands or data received from other elements of the electronic device 101 to the user or another external device.

The display 160 may include a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of content (for example, text, images, videos, icons, or symbols) for users. The display 160 may include a touch screen that receives a touch input, a gesture input, a proximity input, and/or a hovering input using an electronic pen or a user's body part.

The communication interface 170 may configure communication between the electronic device 101 and a first external electronic device 102, a second external electronic device 104, or an application market 106. The communication interface 170 may be connected to a network 162 through wireless or wired communication to communicate with the second external electronic device 104 or the application market 106.

The wireless communication may use, for example, at least one of Long Term Evolution (LTE), LTE-Advanced (LTE-A), code division multiple access (CDMA), wideband CDMA (WCDMA), Universal Mobile Telecommunications System (UMTS), wireless broadband (WiBro), and Global System for Mobile Communications (GSM), for example, as a cellular communication protocol. The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of communication networks such as a computer network (for example, a local area network (LAN) or a wide area network (WAN)), the Internet, and a telephone network.

The first and second external electronic devices 102 and 104 may be the same type as or different type from the electronic device 101.

The application market 106 may include a group of one or more servers.

All or some of the operations performed by the electronic device 101 may be performed by another electronic device or a plurality of electronic devices 102, 104, or the application market 106.

When the electronic device 101 should perform some functions or services automatically or by request, the electronic device 101 may request that at least some of the functions related to the functions or services are performed by another device 102, 104, or the application market 106 instead of performing the functions or services by itself. The other electronic device(s) may carry out the requested function or the additional function and transfer the result, obtained by carrying out the function, to the electronic device 101. The electronic device 101 may provide the requested functions or services based on the result as received or after additionally processing the received result. For example, cloud computing, distributed computing, or client-server computing technology may be used.

The communication module 170 may be electrically connected to the processor 120. Further, the processor 120 may be electrically connected to the memory 130.

The memory 130 may include instructions for the processor 120 to perform operations. For example, the instructions may include an operation for providing a first environment in which at least one application may operate and a second environment having an operation environment which is at least partially different from the first environment. The first environment may be a general area and the second environment may be a sandbox or a container. The instructions may also include an operation for accessing an application market provided by an external server through a communication module, at least partially in response to a first input of the user in the first environment. The instructions may include an operation for downloading the selected first application from the application market at least partially and installing the downloaded first application in response to a second input of the user in the first environment. The instructions may also include an operation for allocating the installed first application to the first environment and/or an operation for allocating the installed first application to the second environment without a user input.

The first application may include metadata indicating whether the first application is an application to be executed in the second environment.

The processor 120 may generate the second environment, which has not yet been generated in the electronic device, based on the metadata. For example, the metadata may include at least one piece of particular data, a security level of the first application, and authentication-related data for security.

The processor 120 may determine whether to allocate the first application to the second environment for security according to the security level.

The communication module 170 may transmit an authentication request for the first application to the security server and receive an authentication result that responds to the authentication request from the security server.

The processor 120 may determine whether to allocate the first application to the second environment based on the authentication result and allocate the first application to the second environment according a result of the determination on the allocation.

The authentication request may include at least one of a security key for the authentication and an encoded value by the security key.

The processor 120 may control the display 160 to display execution icons for executing the applications allocated to the first environment and the second environment on a single screen. The second environment may correspond with a user identifier.

The instructions may also include an operation for providing a first environment in which at least one application may operate and a second environment having an operation environment which is at least partially different from the first environment. The instructions may include an operation for, when an execution command of the first application is acquired through the input/output interface, determining whether the first application is an application to be executed in the second environment. The instructions may include an operation for, when it is determined that the first application is the application to be executed in the second environment, executing the first application in the second environment.

The display 160 may display an execution icon of the first application.

The input/output interface 150 may acquire a designation of the execution icon of the first application.

The first environment and the second environment may correspond with each piece of user identification information.

The processor 120 may identify metadata, which is included in the first application and indicates whether the first application is executed in the second environment. The metadata may include at least one of data inserted into the first application when the first application is manufactured, a security level of the first application, and an authentication result of the first application.

The processor 120 may determine whether the first application is installed in the second environment.

When the first application is not allocated to the second environment, the processor 120 may refrain from executing the first application or may execute the first application in the first environment.

When the first application is allocated to the second environment, the processor 120 may execute the first application in the second environment.

The processor 120 may determine whether the first application corresponds is successfully authenticated and determine whether data of the first application is stored in the second environment.

The processor 120 may receive a selection of one of the first environment and the second environment, and execute the first application in the selected area.

An icon corresponding to the application executed in the second environment may be arranged on a screen corresponding to the first environment.

Figure 2:
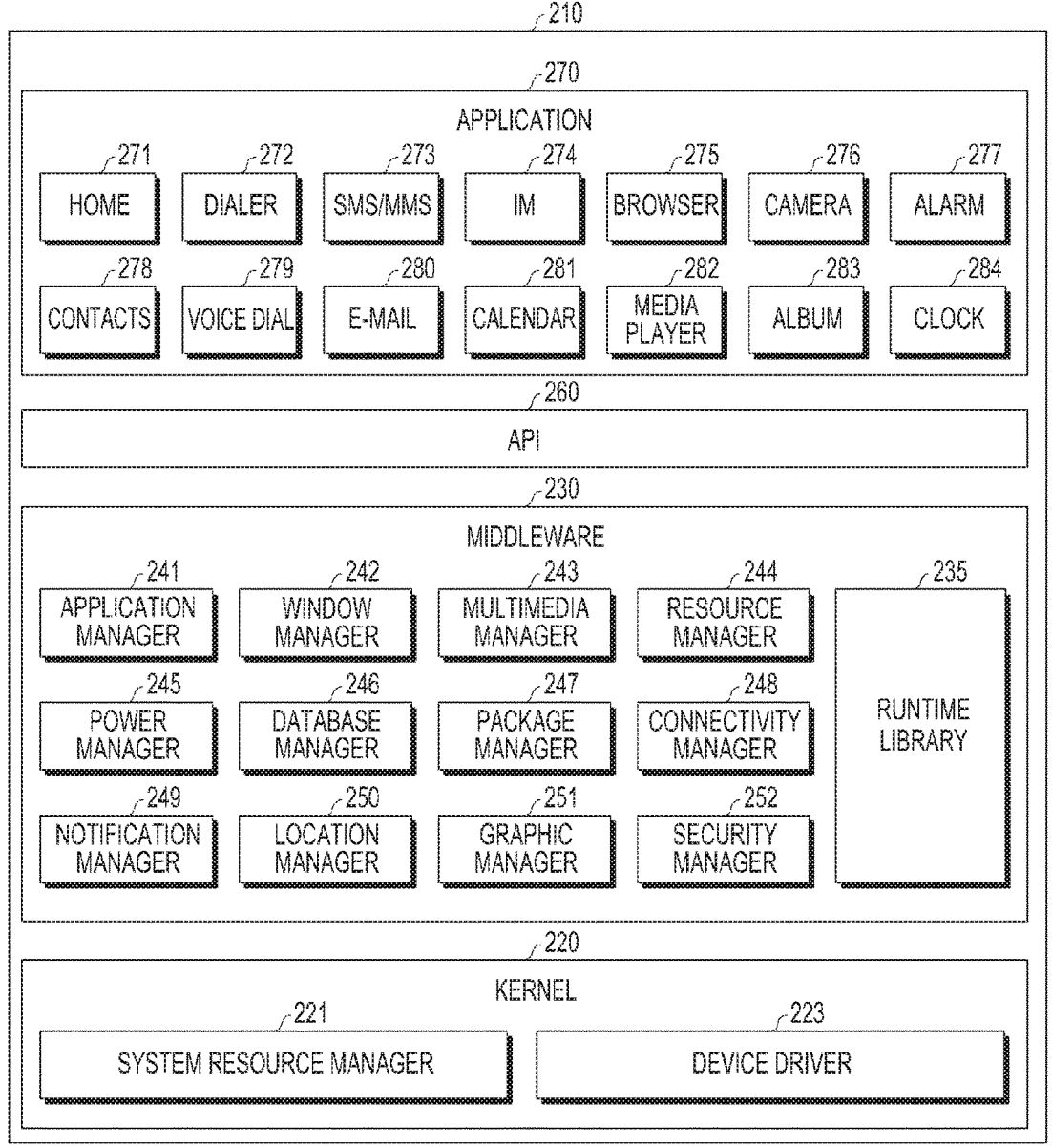
FIG. 2 illustrates a program module according to an embodiment of the present disclosure.

FIG. 2 illustrates a program module according to an embodiment of the present disclosure. For example, the program 140 of FIG. 1 may be embodied by the program module 210 illustrated in FIG. 2.

The program module 210 may include an OS for controlling resources related to an electronic device and/or various applications executed in the OS. For example, the OS may be Android®, iOS®, Windows®, Symbian®, Tizen®, Bada®, etc.

Referring to FIG. 2, the program module 210 includes a kernel 220, middleware 230, an API 260, and applications 270. At least some of the program module 210 may be preloaded in the electronic device or downloaded from a server.

The kernel 220 includes a system resource manager 221 and a device driver 223. The system resource manager 221 may control, allocate, and/or collect the system resources. The system resource manager 221 may include a process manager, a memory manager, and/or a file system manager.

The device driver 223 may include a display driver, a camera driver, a Bluetooth driver, a shared-memory driver, a USB driver, a keypad driver, a Wi-Fi driver, an audio driver, and/or an Inter-Process Communication (IPC) driver.

The middleware 230 may provide a function required by the applications 270 in common or provide various functions to the applications 270 through the API 260 so that the applications 270 may efficiently use limited system resources of the electronic device. The middleware 230 includes a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module, which is used by a compiler to add new functions through a programming language while the application 270 is executed. The runtime library 235 may perform input/output management, memory management, and/or a function for an arithmetic function.

The application manager 241 may manage a life cycle of at least one application among the applications 270.

The window manager 242 may manage a graphic user interface (GUI) resource used in a screen.

The multimedia manager 243 may detect a format required for reproducing various media files and encode or decode a media file using a codec appropriate for the corresponding format.

The resource manager 244 may manage resources such as a source code, a memory or a storage space of at least one application among the applications 270.

The power manager 245 may operate together with, for example, a Basic Input/Output System (BIOS), to manage a battery or power consumption and may provide power information for the operation of the electronic device.

The database manager 246 may generate, search for, and/or change a database to be used by at least one of the applications 270.

The package manager 247 may manage the installation or updating of applications distributed in the form of a package file.

For example, the connectivity manager 248 may manage wireless connections, such as Wi-Fi or Bluetooth.

The notification manager 249 may display or notify of an event, such as a received message, an appointment, a proximity notification, etc, to a user.

The location manager 250 may manage location information of the electronic device.

The graphic manager 251 may manage graphic effects to be provided to a user and user interfaces related to the graphic effects.

The security manager 252 may provide various security functions for system security or user authentication.

When the electronic device (has a call function, the middleware 230 may further include a telephony manager for managing a voice call function or a video call function of the electronic device.

The middleware 230 may also include a middleware module for forming a combination of various functions of the aforementioned elements. The middleware 230 may provide a module specialized for each type of operating system in order to provide a differentiated function.

Alternatively, at least one of the above-described elements may be removed from the middleware 230, or new elements may be added thereto.

The API 260, which is a set of API programming functions, may be provided in a different configuration for each OS. For example, for Android® or iOS®, one API set may be provided for each platform, and for Tizen®, two or more API sets may be provided for each platform.

The applications 270 include a home application 271, a dialer application 272, an SMS/MMS application 273, an Instant Message (IM) application 274, a browser application 275, a camera application 276, an alarm application 277, a contacts application 278, a voice dial application 279, an e-mail application 280, a calendar application 281, a media player application 282, an album application 283, and a clock application 284. The applications 270 may also include a health care application (e.g., an application for measuring an amount of exercise or blood sugar level) and an environmental information application (e.g., an application for providing atmospheric pressure, humidity, or temperature information).

The applications 270 may also include an application supporting information exchange between the electronic device and an external electronic device (hereinafter, referred to as an "information exchange application"). The information exchange application may include a notification relay application for transmitting predetermined information to the external electronic device, and/or a device management application for managing the external electronic device.

For example, the notification relay application may include a function of transferring, to the external electronic device, notification information generated from other applications of the electronic device (for example, an SMS/MMS application, the e-mail application 280, a health management application, or an environmental information application).

Further, the notification relay application may receive notification information from an external electronic device and provide the received notification information to a user.

The device management application may manage (e.g., install, delete, and/or update) a function for at least a part of the external electronic device communicating with the electronic device (for example, turning on/off the external electronic device itself or adjusting brightness of a display), applications executed in the external electronic device, or services provided from the external electronic device (e.g., a telephone call service or a message service).

The applications 270 may include an application (e.g., the health management application) designated according to attributes of the external electronic device (e.g., attributes of the electronic device such as the type of electronic device which corresponds to a mobile medical device).

The applications 270 may include an application received from an external electronic.

The applications 270 may include a preloaded application or a third party application that can be downloaded from the server.

The names of the elements of the program module 210 illustrated in FIG. 2 may change depending on the type of OS.

At least some of the program module 210 may be implemented in software, firmware, hardware, or a combination of two or more thereof. At least some of the programming module 210 may be implemented by a processor. At least some of the programming module 210 may include a module, program, routine, sets of instructions, process, etc., for performing one or more functions.

Figure 3A:
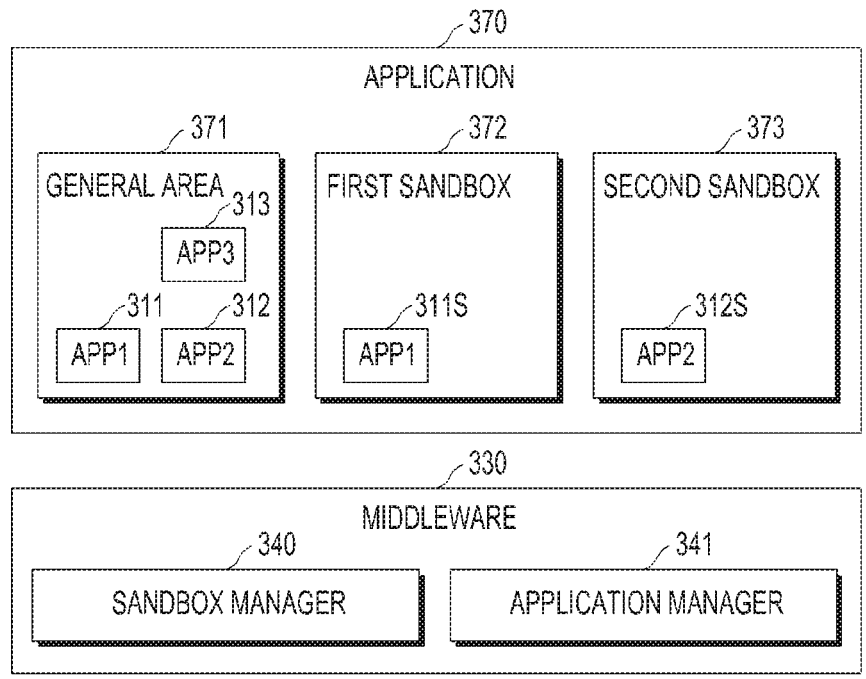
FIGS. 3A and 3B illustrate program modules according to various embodiments of the present disclosure.
Figure 3B:
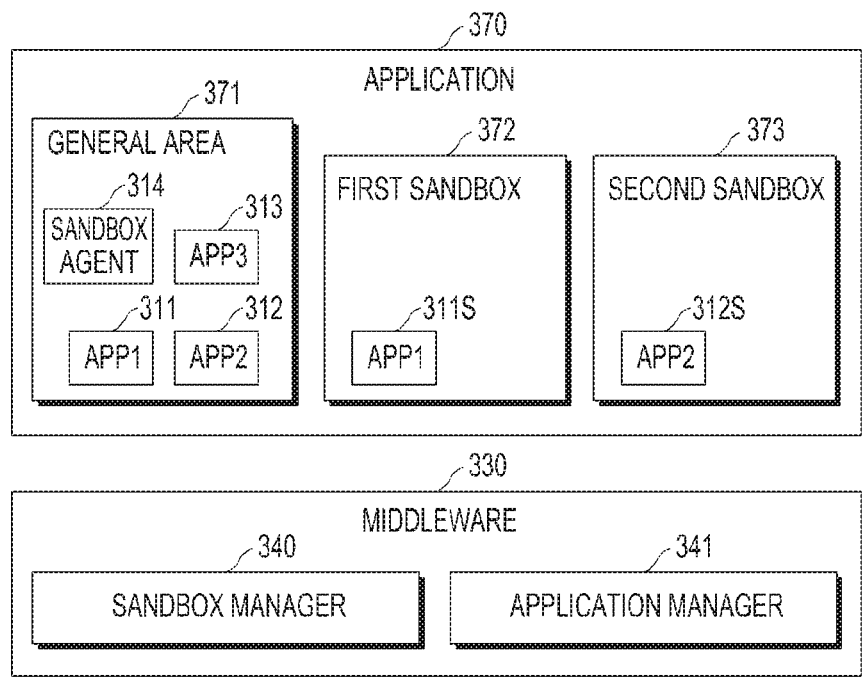

FIGS. 3A and 3B illustrate program modules according to various embodiments of the present disclosure. Specifically, FIGS. 3A and 3B illustrate sandbox areas in an electronic device.

Referring to FIG. 3A, the program module includes an application layer 370 in which applications are installed and executed. The application layer 370 may be configured as an area in which data required for executing applications is stored and processed. The application layer 370 may also transmit/receive data to/from a middleware layer 330.

The application layer 370 includes a general area 371, a first sandbox 372, and a second sandbox 373. The first and second sandboxes 372 and 373 may also be referred to as "security areas", "containers", etc., according to implementation. Each of the general area 371, the first sandbox 372, and the second sandbox 373 may be configured according to a user identifier. For example, the general area 371 may correspond to a user identifier "0", the first sandbox 372 may correspond to a user identifier "200", and the second sandbox 373 may correspond to a user identifier "201".

As an example, FIGS. 3A and 3B illustrate a first application (APP1), a second application (APP2), and a third application (APP3) being stored in the application layer 770. The first application (APP1) and the second application (APP2) are allocated to the general area 371 (i.e., APP1 311 and APP 312) and are also allocated to the first sandbox 372 and the second sandbox 373, respectively (i.e., APP1 311S and APP 312S). The third application (APP3) 313 does not need to be allocated to one the sandboxes 372 and 373 and is allocated to the general area 371. For example, the third application 313 does not require security-processing and, accordingly, does not need to be allocated to one the sandboxes 372 and 373. The third application 313 may share data and code execution with another application, as opposed to the application allocated to the sandbox.

The first application 311S installed and allocated to the first sandbox 320, which requires security-processing, is allocated to and executed in the first sandbox 372, separately from the general area 371. For example, the first application 311S may input/output data, which is required to be security-processed, and data of the first application 311S, which is required to be security-processed, may be stored or processed in resources corresponding to the first sandbox 372.

The second application 312S installed and allocated to the second sandbox 373, which requires security-processing, and should not share data with the first application 311S. By the electronic device allocating the first application 311S to the first sandbox 372 and the second application 312S to the second sandbox 373, to the electronic device prevents data and code execution from being shared between the first application 311S and the second application 312S.

As described above, the first application 311 and the second application 312 may be allocated to the general area 310. For example, the first application 311 and the second application 312, operate in a general mode, rather than a security mode like the first application 311S and the second application 312S.

Accordingly, the electronic device may execute the first application 311 and the second application 312 in the general mode, and the first application 311 may share data and code execution with the second application 312 and the third application 313 in the general mode.

The electronic device may also execute the first application 311S and the second application 312S in the security mode. As described above, the first application 311S may not share data and code execution with the second application 312S in the security mode or the second application 312 and the third application 313 in the general mode. Since the first application 311 allocated to the general area 371 and the first application 311S allocated to the first sandbox 372 may have the same package identifier or the same application identifier and different user identifiers, they may operate as different applications.

The electronic device may display a screen for execution of an application, e.g., a launcher application screen. Specifically, the electronic device may display a screen for executing applications including the applications allocated to the general area 371, the first sandbox 372, and the second sandbox 373. In this case, when a user corresponding to the user identifier "0" executes the first application (APP1), the first application 311 allocated to the general area 371 may be executed in the general mode. Further, when a user corresponding to the user identifier "200" executes the first application (APP1), the first application 311S allocated to the first sandbox 372 may be executed in the security mode.

The program module also includes middleware 330 that may control a setting of the electronic device by a request from a particular module and perform the generation of the sandboxes 372 and 373 and the allocation of the application.

The middleware 330 includes a sandbox manager 340 and an application manager 341. The sandbox manager 340 may manage generation and deletion of the sandboxes 372 and 373. The application manager 341 may manage installation and execution of the application and determine an allocation location of the application. For example, the application manager 341 may determine the allocation location of the first application 311S as the first sandbox 372 and allocate the first application 311S to the first sandbox 372, when downloading the first application (APP1).

According to another embodiment, as illustrated in FIG. 3B, the general area 370 may also include a sandbox agent 314 that may determine the allocation location of the first application (APP1). For example, the sandbox agent 314 may determine the allocation within the first sandbox 372 with reference to metadata of the application. The sandbox agent 314 may output an installation request including the allocation location of the application 311S to the application manager 341. The application manager 341 may allocate the first application 311S to the first sandbox 372 while installing the first application 311S according to the installation request input from the sandbox agent 314.

The application manager 341 may also allocate the first application 311 to the general area 370. The application manager 341 may be configured as one module or one or more separated modules in the middleware 330. The sandbox agent 314 may transmit an authentication request to a security server or receive an authentication result.

The electronic device may install an application in a platform layer, and store and use a user data set according to an each area. In a process of changing an area, the electronic device may provide a GUI which may perform a user change. For example, the GUI may include a window for inputting a user identifier and a password, and may activate an area corresponding to a logged-in user identifier.

When the first application (APP1) is received, the application manager 341 may determine whether the received first application (APP1) requires a sandbox. The electronic device may install and allocate the first application (APP1) according to whether the received first application requires a sandbox.

Alternatively, when the first application (APP1) is received, the sandbox agent 314 may determine whether the received first application requires a sandbox. The sandbox agent 314 may make a request for allocating the first application to the sandbox to the application manager 341 according to whether the received first application requires a sandbox. The application manager 341 may allocate the first application to the sandbox according to the installation request from the sandbox agent 314.

The first application (APP1) may include metadata indicating whether the received first application requires a sandbox.

The sandbox manager 340 may generate a sandbox, which has not yet been generated in the electronic device, based on the metadata. Alternatively, the sandbox agent 314 may make a request for generating the sandbox, which has not yet been generated in the electronic device, to the sandbox manager 340 based on the metadata. The sandbox manager 340 may then generate the sandbox, which has not yet been generated, in response to the request from the sandbox agent 314.

The sandbox agent 314 may transmit an authentication request for the first application to a security server and receive an authentication result in response to the authentication request, from the security server.

Figure 4A:
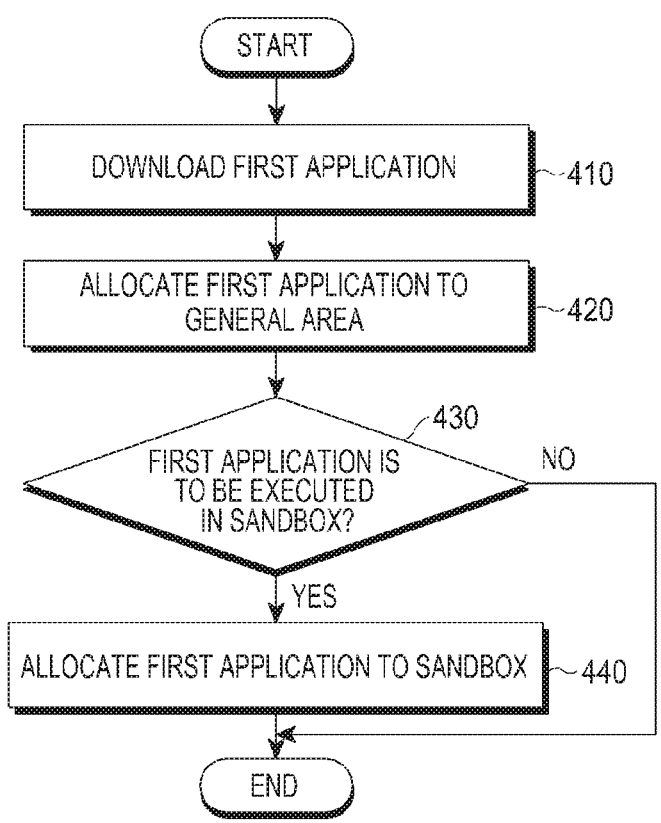
FIGS. 4A to 4C are flowcharts illustrating methods of installing an application according to various embodiments of the present disclosure.
Figure 4B:
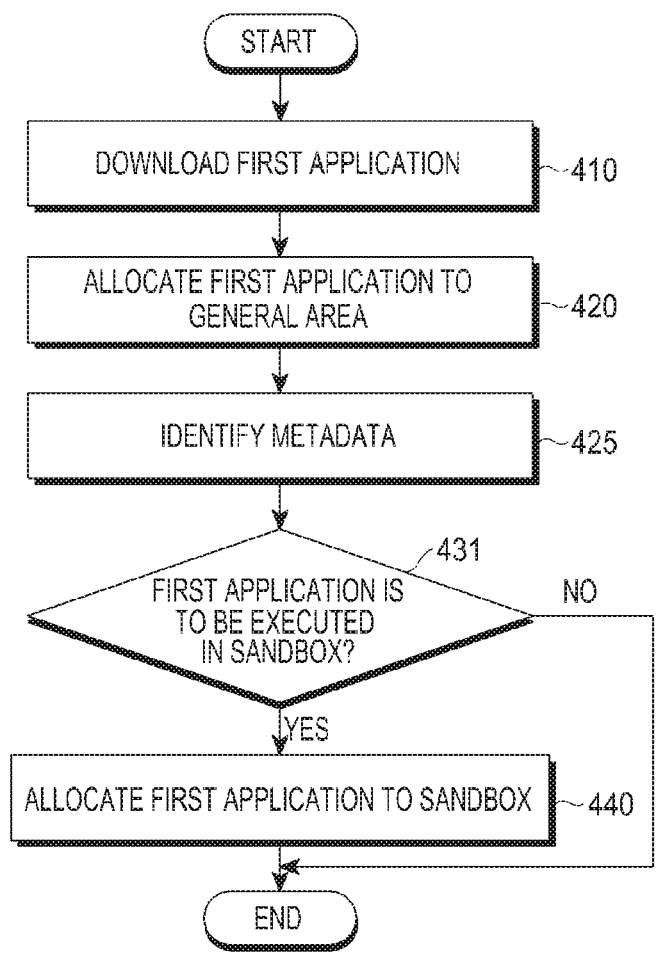
Figure 4C:
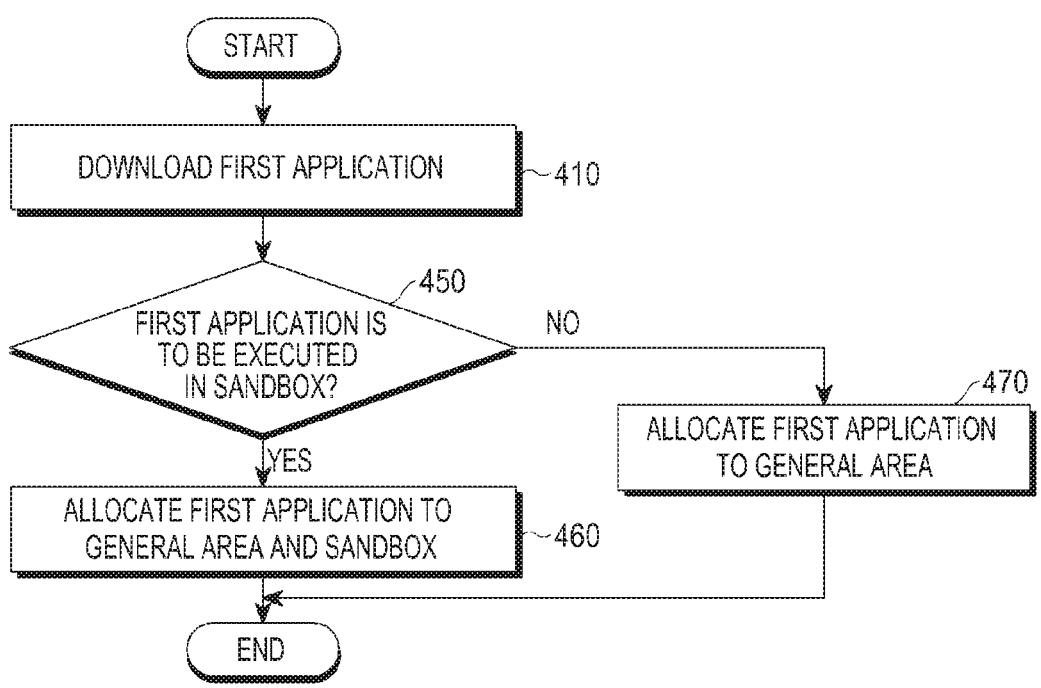

FIGS. 4A to 4C are flowcharts illustrating methods of installing an application according to various embodiments of the present disclosure.

Referring to FIG. 4A, an electronic device downloads a first application in step 410. For example, the electronic device may download the first application from an application market.

In step 420, the electronic device installs the downloaded first application and allocates the first application to the general area.

In step 430, the electronic device determines whether the downloaded first application is to be executed in a sandbox. For example, the first application may include metadata indicating whether the first application is to be executed in a sandbox. For example, when the first application is produced based on an Android® OS, the first application may include metadata in the form in which particular data is inserted into a file of AndroidManifest.xml.

When the electronic device determines that the first application is to be executed in the sandbox, the electronic device allocates the first application to the sandbox in step 440.

Figure 5A:
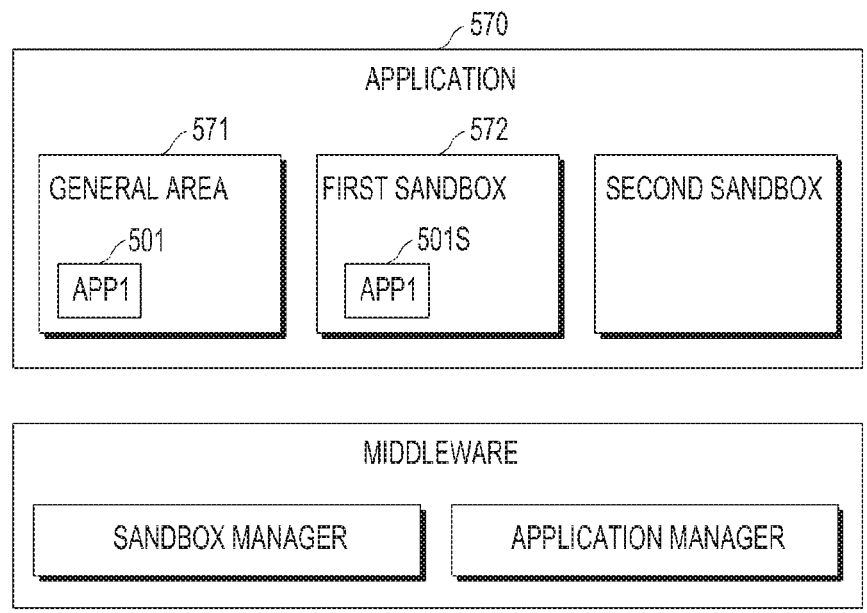
FIGS. 5A and 5B illustrate program module according to various embodiments of the present disclosure.
Figure 5B:
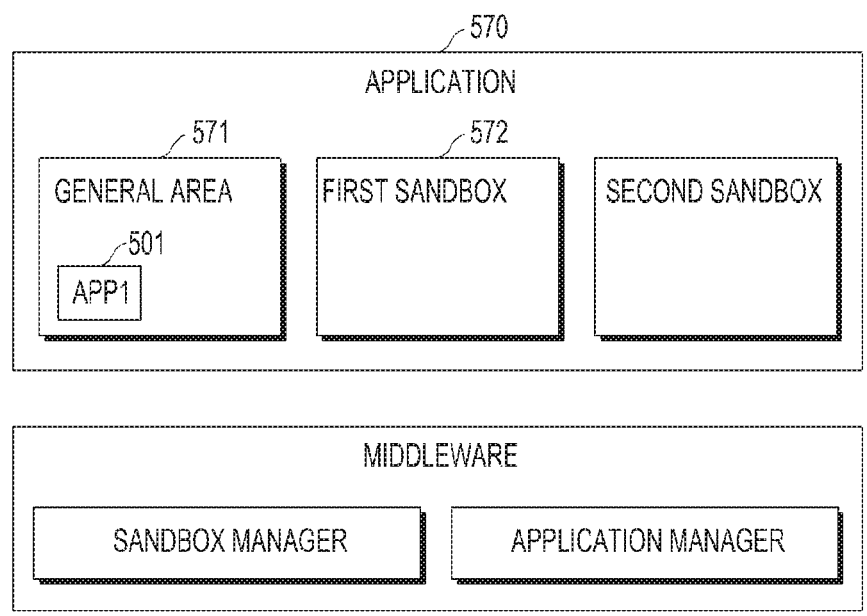

FIGS. 5A and 5B illustrate program module according to various embodiments of the present disclosure.

Referring to FIG. 5A, the electronic device may first allocate a first application 501 to A general area 571 of an application layer 570 and also allocate a first application 501S to the first sandbox 572. In this case, the electronic device may allocate data corresponding to the general mode of the first application 501 to resources corresponding to the general area 510 and allocate data corresponding to the security mode of the first application 501S to resources corresponding to the first sandbox 521.

Referring again to FIG. 4A, when the first application is not to be executed in the sandbox in step 430, the method ends with the electronic device allocating the first application only to the general area.

Referring to FIG. 5B, the electronic device may allocate the first application 501 to the general area 571. In this case, the electronic device allocates the data corresponding to the general mode of the first application 501 to the resources corresponding to the general area 510. When the first application 501 is executed, data and code execution of the first application 501 may be shared with another application.

FIG. 4B is a flowchart illustrating a method of installing an application according to an embodiment of the present disclosure.

Referring to FIG. 4B, the same as illustrated in FIG. 4A, the electronic device downloads a first application in step 410 and installs the first application and allocates the first application to the general area in step 420.

In step 425, the electronic device identifies metadata of the first application. For example, the electronic device may identify the metadata from particular data inserted into a file of the first application. The metadata relates to whether the application should be allocated to a security area, and may directly indicate whether the application should be allocated to the security area or implemented in the form of a security level.

In step 431, the electronic device determines whether the first application is an application allocated to the security area based on the identified metadata. For example, when the metadata directly indicates that the first application should be allocated to the security area, the electronic device determines that the first application is allocated to the security area. Alternatively, when the metadata corresponds to the security level, the electronic device may determine whether the first application is allocated to the security area according to the identified security level.

When the electronic device determines that the first application is to be executed in the sandbox, the electronic device allocates the first application to the sandbox in step 440.

FIG. 4C is a flowchart illustrating a method of installing an application according to an embodiment of the present disclosure.

Referring to FIG. 4C, the electronic device downloads and installs the first application in step 410.

In step 450, the electronic device determines whether the first application is to be executed in a sandbox. When it is determined that the first application is to be executed in the sandbox, the electronic device allocates the first application to the general area and the sandbox in step 460. However, when it is determined that the first application is not to be executed in the sandbox, the electronic device allocates the first application to the general area in step 470.

Figure 6A:
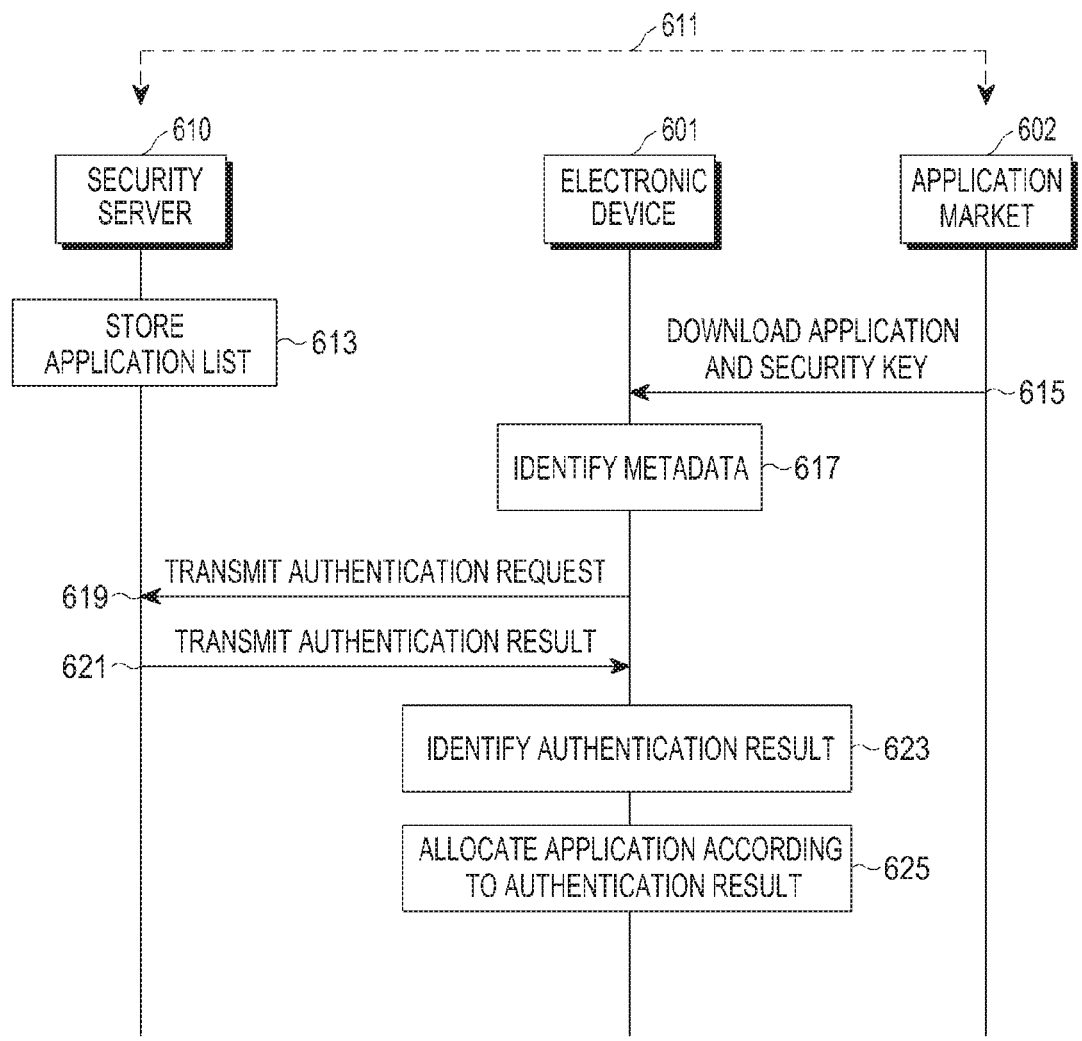
FIG. 6A is a signal flow diagram illustrating a method of installing an application according to an embodiment of the present disclosure.

FIG. 6A is a signal flow diagram illustrating a method of installing an application according to an embodiment of the present disclosure.

Referring to FIG. 6A, in step 611, a security server 610 shares an application list with an application market 602. The security server 610 may receive correlation information between an application uploaded to the application market 602 and a security key corresponding to the application from the application market 602 or another external entity. Table 1 shows an example of the correlation information between the application and the security key according to an embodiment of the present disclosure.

TABLE 1

| Application | Security key |
|---|---|
| First application | akbidll |
| Second application | vnei3 |
| Third application | villlwo5 |

In step 613, the security server 610 stores an application list, e.g., like Table 1.

In step 615, the electronic device 601 downloads and installs the application from the application market 602. The electronic device 601 may also download the security key from the application market 602. The security key stored in the security server 610 and the security key received by the electronic device 601 may be different from or the same as each other. The security key stored in the security server 610 and the security key received by the electronic device 601 may be key values that can be used in various encoding/decoding algorithms.

In FIG. 6A, it is assumed that the electronic device 601 downloads the first application and the security key of "akbidll" from the application market 602. The first application may include metadata indicating that the first application is executed in the sandbox. As described above, the metadata may be data indicating the execution in the sandbox or the security level, or the security key may be used as the metadata.

In step 617, the electronic device 601 identifies the metadata and determines whether the downloaded first application is to be executed in the sandbox according to a result of the identification. For example, the electronic device 601 may determine whether the first application is to be executed in the sandbox based on data indicating that the first application is executed in the sandbox, which is directly implied in the metadata. Alternatively, the electronic device 601 may determine that the first application is executed in the sandbox according to a security level of the first application. Alternatively, the electronic device 601 may determine that the first application is executed in the sandbox based on the security key received with the first application.

In step 619, the electronic device 601 transmits an authentication request for the first application to the security server 610. For example, the authentication request may include an identifier of the first application and the security key. The identifier of the first application may be implemented by various pieces of information such as an application package name, an application registration number, etc., and it may be understood by those skilled in the art that there is no limitation on data if the application can be identified through the data.

Alternatively, the authentication request may include a value encoded using the security key. The electronic device 601 may generate the encoded value by applying various encoding algorithms to the security key received from the application market 602. The electronic device 601 may transmit the authentication request including the application identifier and the encoded value.

Alternatively, an application developer may sign the application using the security key, and the security server 610 may perform the authentication by identifying the signing. The sandbox agent may transmit the authentication request to the security server 610 and receive an authentication result from the security server 610.

In step 621, the security server 610 may transmit an authentication result corresponding to the authentication request to the electronic device 601. The security server 610 may perform the authentication by comparing the application identifier and the security key, which are included in the authentication request, with the stored application list. Alternatively, the security server 610 may perform the authentication by decoding the encoded value, which is included in the authentication request, by using the pre-stored security key. The security server 610 may determine whether or not the authentication of the first application is successful. The security server 610 may transmit the authentication result including authentication success or authentication failure to the electronic device 601.

In step 623, the electronic device 601 identifies the authentication result.

In step 625, the electronic device 601 allocates the first application according to the authentication result. For example, when the authentication is successful, the electronic device 601 may allocate the first application to the general area and the sandbox. Alternatively, the electronic device 601 may allocate the first application to the sandbox.

The metadata may further include user identifier information on the sandbox, to which the metadata should be allocated, and the electronic device 601 may allocate the first application to the corresponding sandbox with reference to the metadata.

Alternatively, according to an embodiment in which the metadata does not include the user identifier information, the electronic device 601 may, based on the metadata, determine a sandbox to which the first application will be allocated and allocate the first application to the determined sandbox.

When the sandbox, to which the first application will be allocated, has not yet been generated, the electronic device 601 may generate the sandbox and allocate the first application.

When the authentication fails, the electronic device 601 may allocate the first application to the general area.

Although the security server 610 and the application market 602 are illustrated as different entities in FIG. 6A, the security server 610 and the application market 602 may be implemented as a single entity.

Figure 6B:
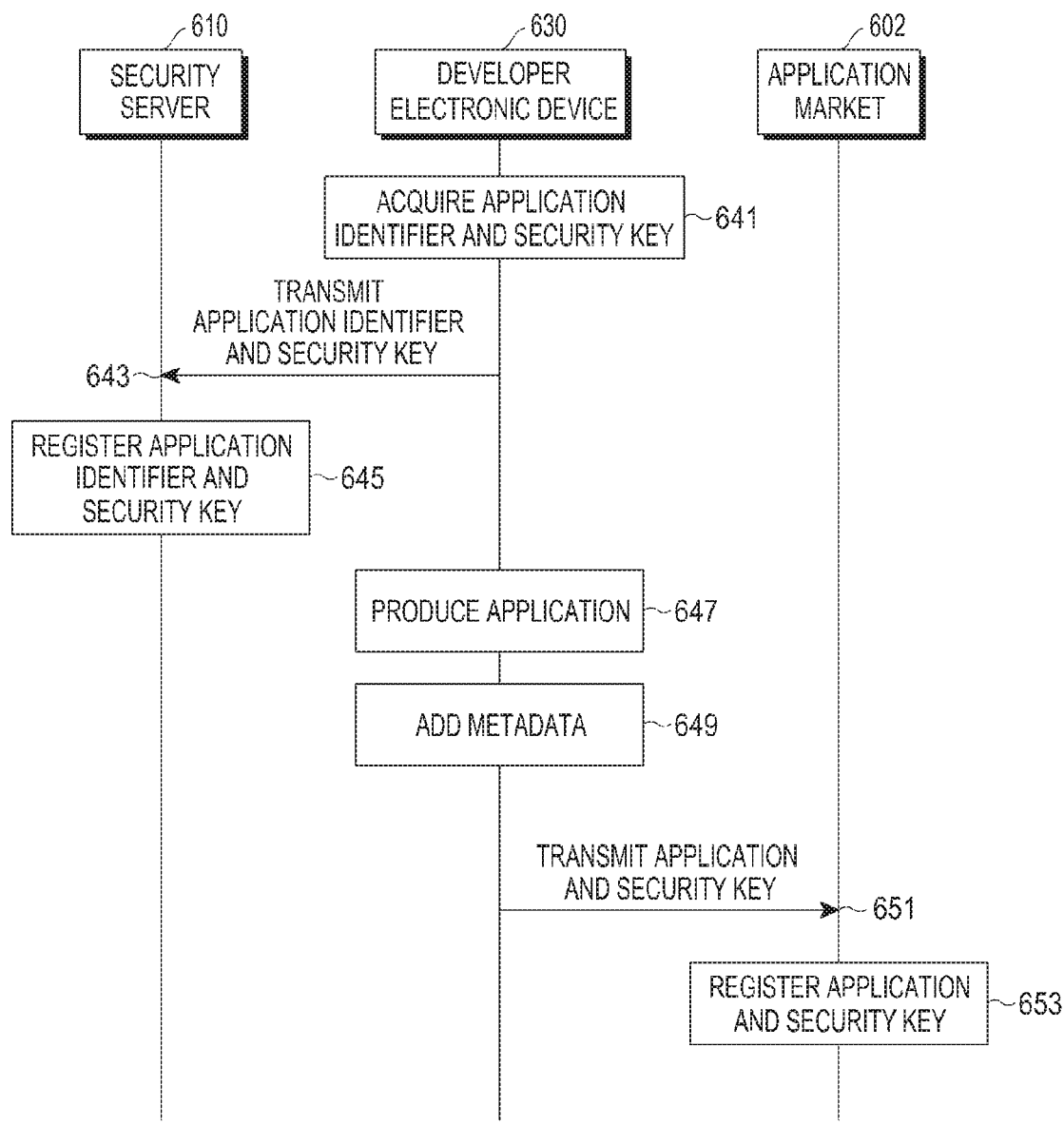
FIG. 6B is a signal flow diagram illustrating a method of uploading an application according to an embodiment of the present disclosure.

FIG. 6B is a flowchart illustrating a method of uploading an application according to an embodiment of the present disclosure.

Referring to FIG. 6B, in step 641, a developer electronic device 630 acquires an application identifier and a security key. For example, the developer electronic device 630 may acquire the application identifier and the security key through a contract with a platform operator. In this case, the application identifier and the security key may be referred to as a license key.

In step 643, the developer electronic device 630 transmits the application identifier and the security key to the security server 610.

In step 645, the security server 610 registers the received application identifier and security key. Accordingly, the security server 610 may store correlation information between the application identifier and the security key. The security server 610 may authenticate the authentication request received from the electronic device 601 by using the correlation information between the pre-stored application identifier and the security key as illustrated in FIG. 6A.

In step 647, the developer electronic device 630 produces an application.

In step 649, the developer electronic device 630 adds metadata to the application. The metadata may be data indicating whether the application is executed in the sandbox as described above.

In step 651, the developer electronic device 630 transmits the application and the security key to the application market 602.

In step 653, the application market 602 registers the received application and security key. Thereafter, when the application market 602 receives an application download request from the electronic device 601, the application market 602 may transmit the application and the security key to the electronic device 601 in response to the request.

Figure 7:
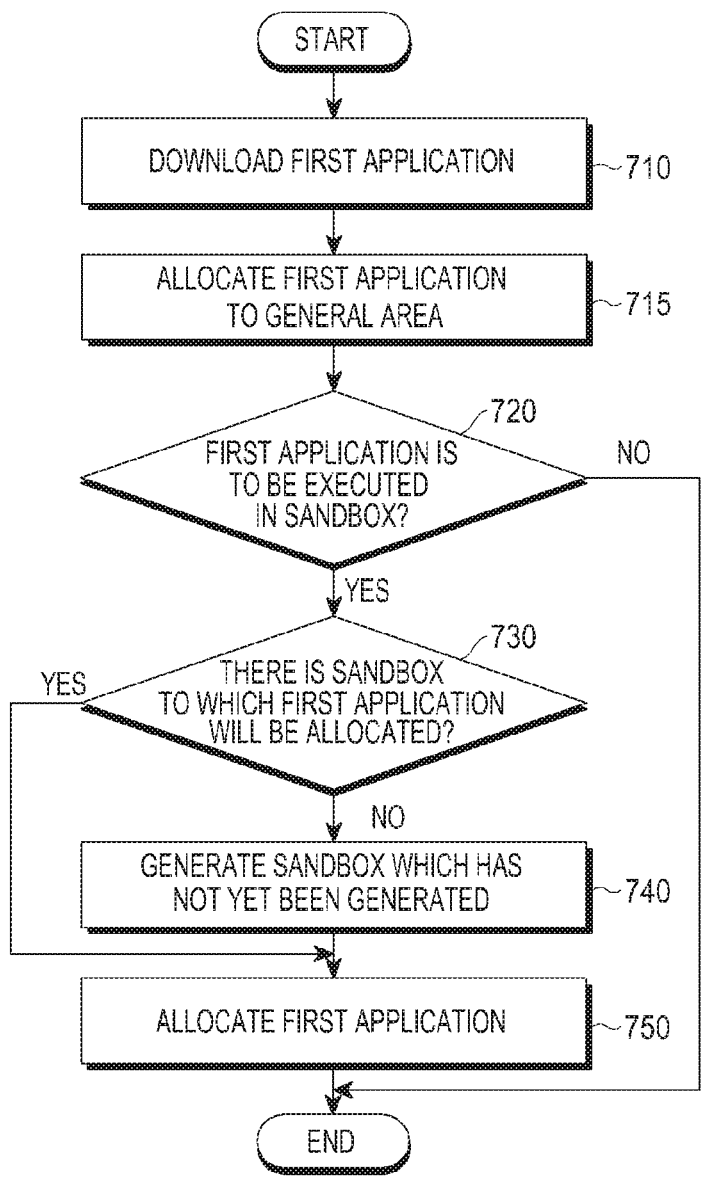
FIG. 7 is a flowchart illustrating a control method of an electronic device according to an embodiment of the present disclosure.

FIG. 7 is a flowchart illustrating a control method of an electronic device according to an embodiment of the present disclosure.

Referring to FIG. 7, the electronic device downloads and installs a first application in step 710.

In step 715, the electronic device allocates the first application to a general area.

In step 720, the electronic device determines whether the first application is to be executed in a sandbox. For example, the electronic device may determine whether the first application is to be executed in the sandbox by using metadata included in the first application.

When it is determined that the first application is the application to be executed in the sandbox in step 720, the electronic device determines whether the sandbox to which the first application will be allocated exists in step 730.

As described above, the metadata may include user identifier information of a sandbox to which the metadata should be allocated, and the electronic device may allocate the first application to the corresponding sandbox with reference to the metadata.

Alternatively, when the metadata does not include the user identifier information, the electronic device may, based on the metadata, determine a sandbox to which the first application will be allocated and allocate the first application to the determined sandbox. Accordingly, the electronic device may determine whether the identified sandbox has been already allocated to the electronic device.

Figure 8A:
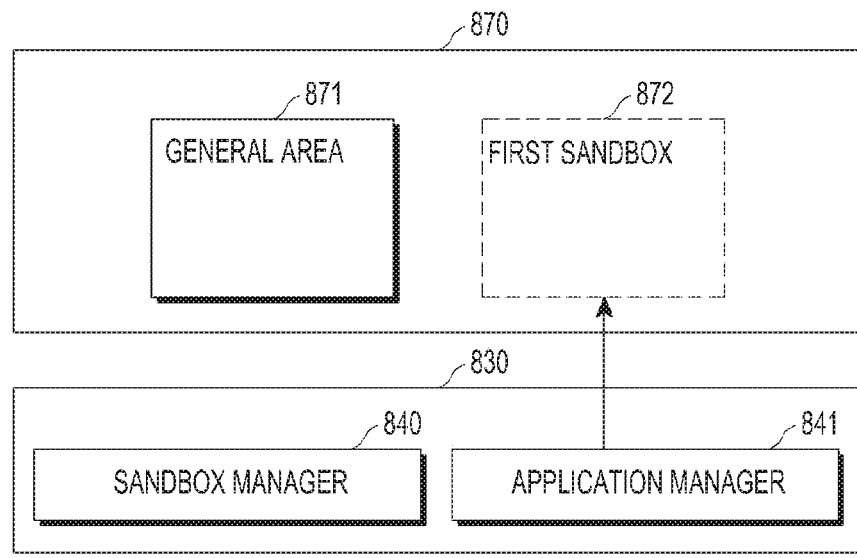
FIGS. 8A and 8B illustrate program modules according to various embodiments of the present disclosure.

FIG. 8A illustrates a program module according to an embodiments of the present disclosure.

Referring to FIG. 8A, the electronic device may determine that the sandbox to which the first application will be allocated is a first sandbox 872 of an application layer 870. The electronic device may determine whether the first sandbox 872 has been already generated.

For example, an application manager 841 defined middleware 830 in the electronic device may determine whether the first sandbox 872 is generated in the application layer 870. In FIG. 8A, it is assumed that the first sandbox 872 has not yet been generated.

Referring again to FIG. 7, when the sandbox has not been generated in step 730, the electronic device generates the sandbox in step 740.

In step 750, the electronic device allocates the first application to the generated or already existing sandbox.

Figure 8B:
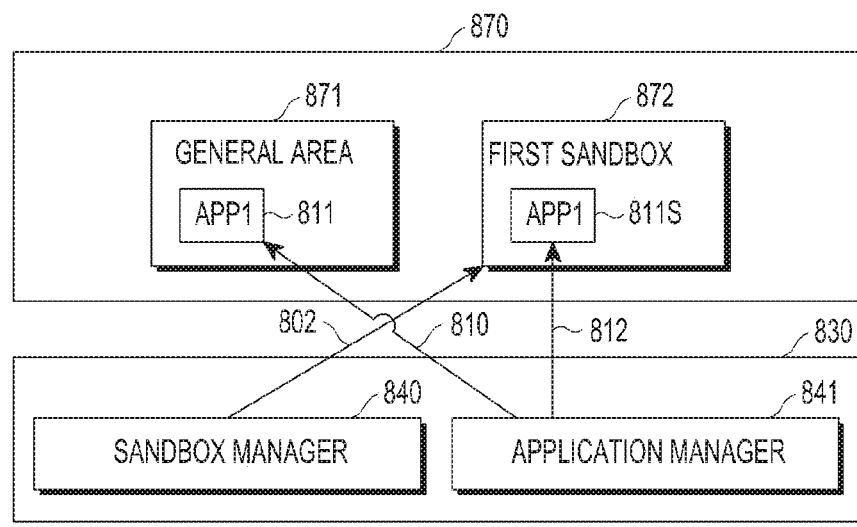

FIG. 8B illustrates a program module according to an embodiments of the present disclosure.

Referring to FIG. 8B, the sandbox manager 840 generates the first sandbox 870 as indicated by reference numeral 802. The electronic device may allocate a first application 811S to the generated or existing sandbox as indicated by reference numeral 812. As illustrated in FIG. 8B, the application manager 841 of the electronic device allocates the first application 811S to the sandbox as indicated by reference numeral 812, also allocates the first application 311 to the general area 871 as indicated by reference numeral 810.

When it is determined that the first application is not the application to be executed in the sandbox, the electronic device may allocate the first application only to the general area.

The electronic device may first determine whether the application is the application to be executed in the sandbox without allocating the application to any area. When it is determined that the application is executed in the sandbox, the electronic device may allocate the application to the general area and the sandbox. When it is determined that the application is not executed in the sandbox, the electronic device may allocate the application to the general area.

FIGS. 9A to 9H illustrate screens of an electronic device according to various embodiments of the present disclosure.

Referring to FIG. 9A, the electronic device displays a menu screen 900. The menu screen 900 is a screen displayed by a launcher application and may also be referred to as a launch application execution screen according to implementation. The electronic device displays an execution icon 901 of a gallery application, an execution icon 902 of a planer application, and an execution icon 903 of an application market application. In this case, the electronic device 101 pre-installs a gallery application 905, a planner application 906, and an application market application 907 in a general area 971. The electronic device acquires an execution command according to designation 904 of the execution icon 903 of the application market application.

Figure 9B:
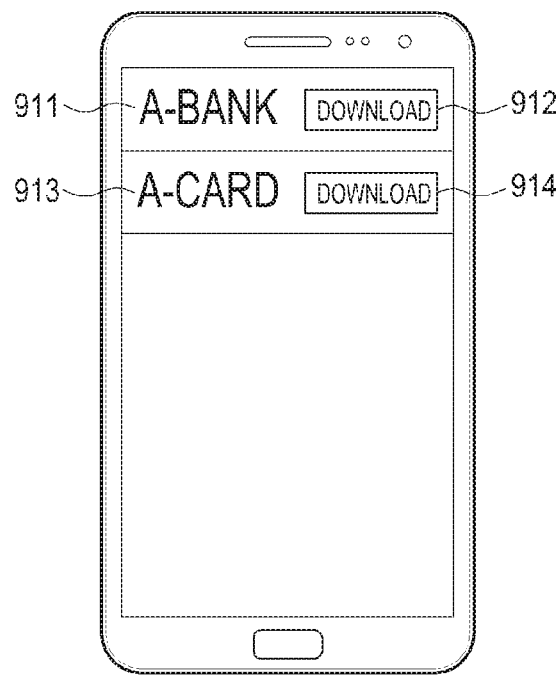

Referring to FIG. 9B, the electronic device executes the application market application 907 according to the execution command. The electronic device displays an execution screen of the application market application, which includes applications 911 and 913 uploaded to the application market and download command objects 912 and 914. Here, it is assumed that the electronic device downloads the "A-bank application" 911 when a user designates the download command object 912.

Figure 9C:
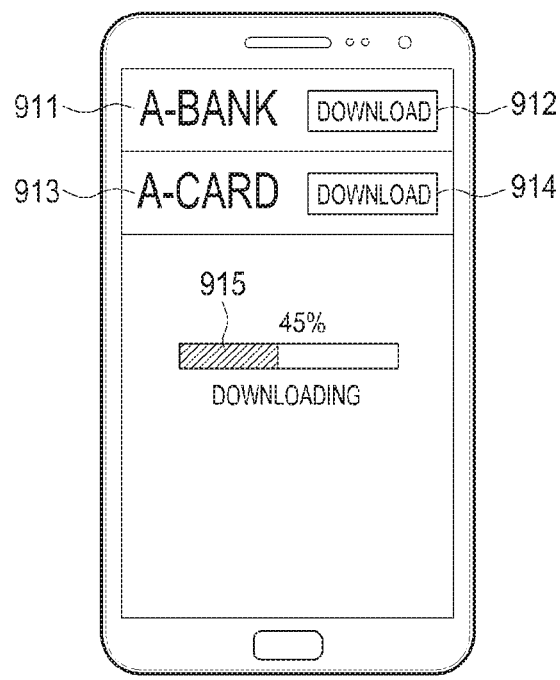

Referring to FIG. 9C, the electronic device displays a download progress indicator 915 for the downloading "A-bank application" 911. When the download is completed, the electronic device 101 may install the downloaded application 911.

Figure 9D:
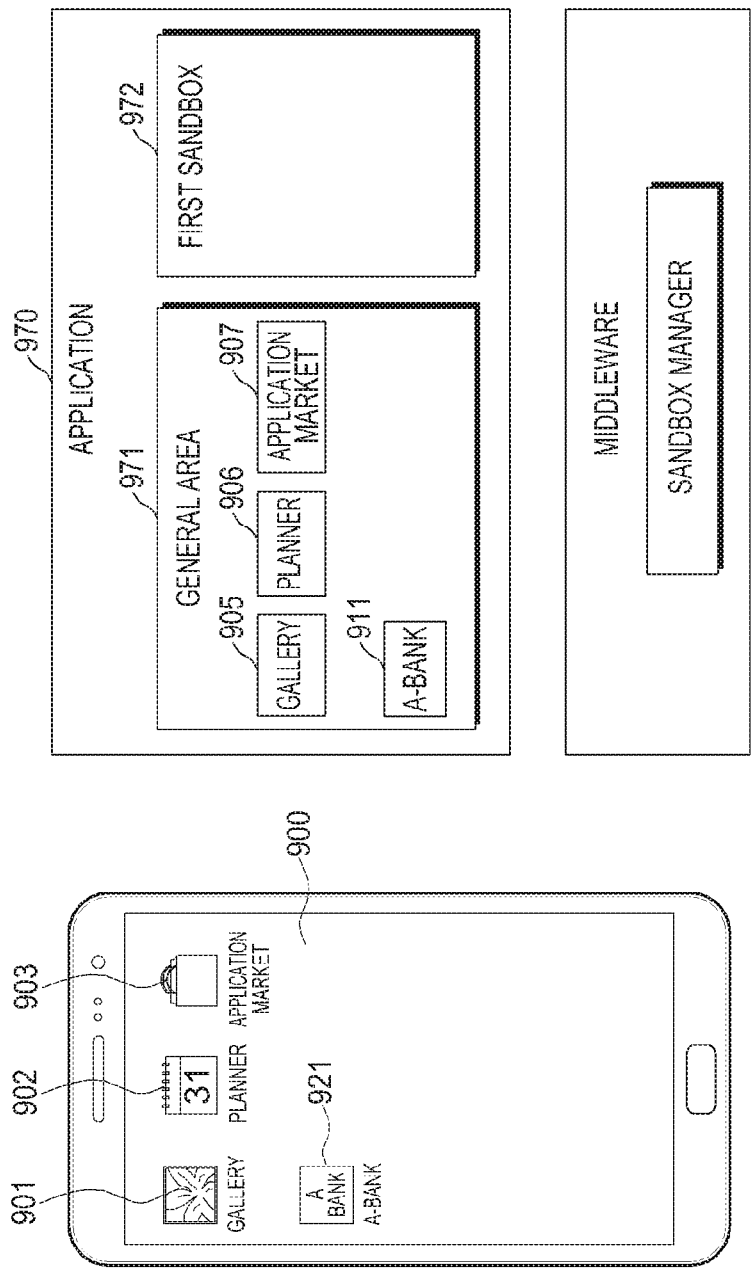

The electronic device may allocate the application 911 to the general area 971 and display an execution icon 921 of the application 911, as illustrated in FIG. 9D.

The electronic device may determine whether the application 911 is to be executed in the first sandbox 972. For example, the electronic device may determine whether the application 911 is to be executed in the sandbox by identifying metadata of the application 911.

Figure 9E:
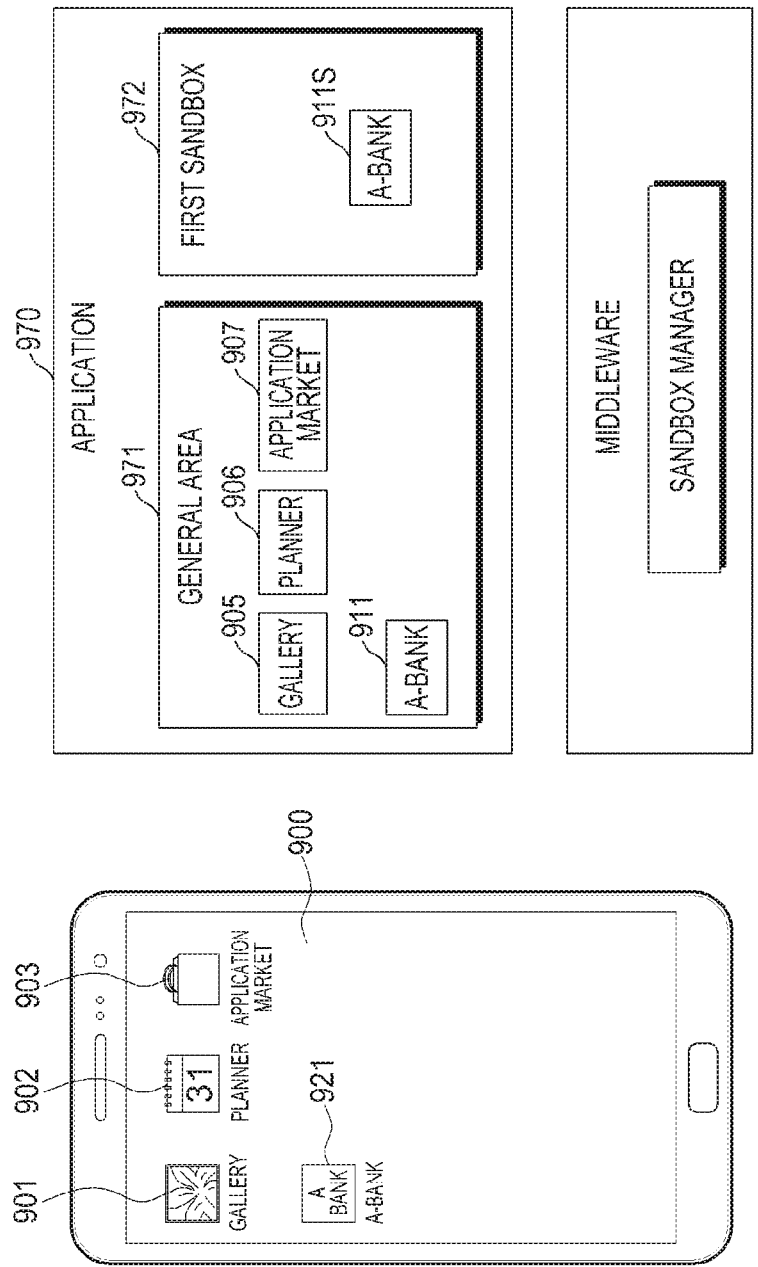

When it is determined that the downloaded application 911 is to be executed in the sandbox, the electronic device may allocate a first application 911S to the first sandbox 972 as illustrated in FIG. 9E.

In FIG. 9E, the electronic device does not display another execution icon on the menu screen 900 for the first application 911S in the first sandbox 972.

Thereafter, when the execution icon 921 is designated, the electronic device determines whether to execute the "A-bank application" 911S in the first sandbox 972 or the "A-bank application" 911 in the general area 921, e.g., based on a user identifier as described above. When the electronic device determines to execute the "A-bank application" 911S in the first sandbox 972, the electronic device may not share data and code execution from the "A-bank application" 911S with an application allocated outside the first sandbox 972.

Figure 9F:
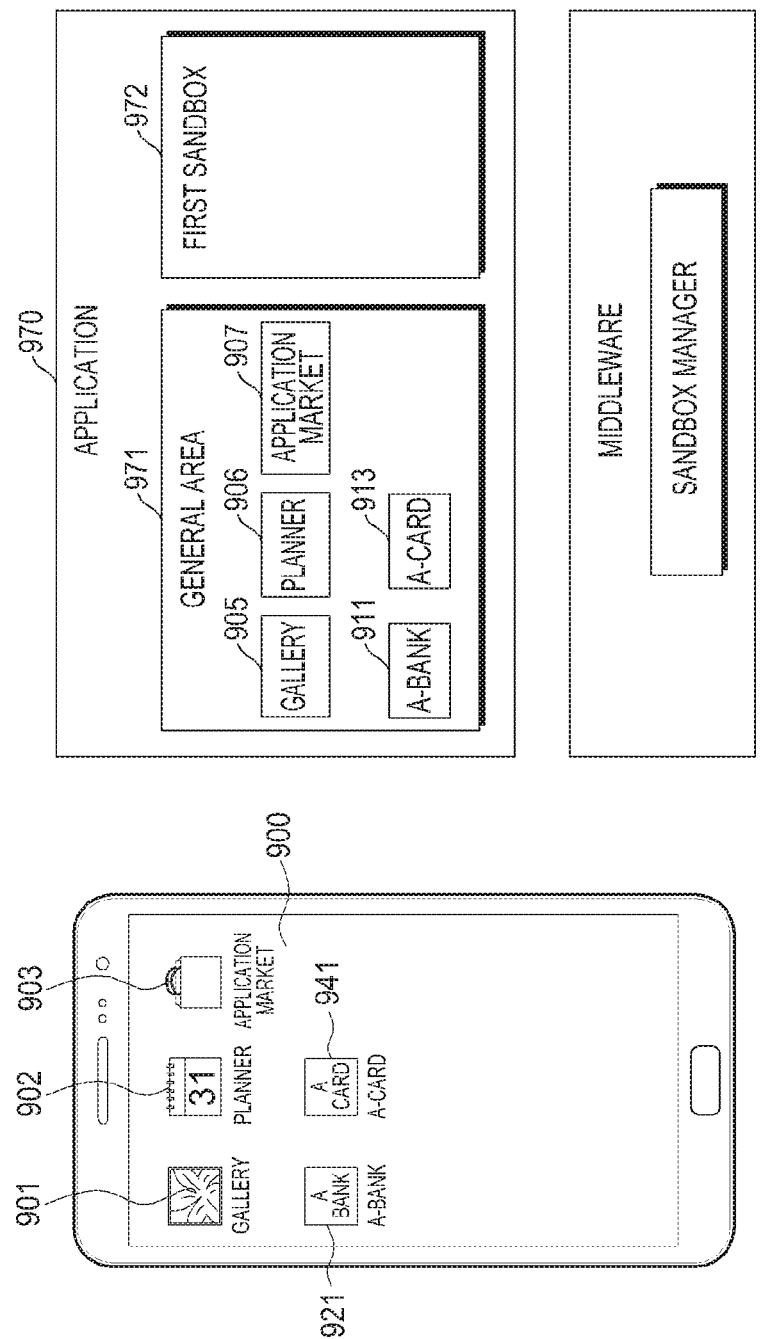
Figure 9G:
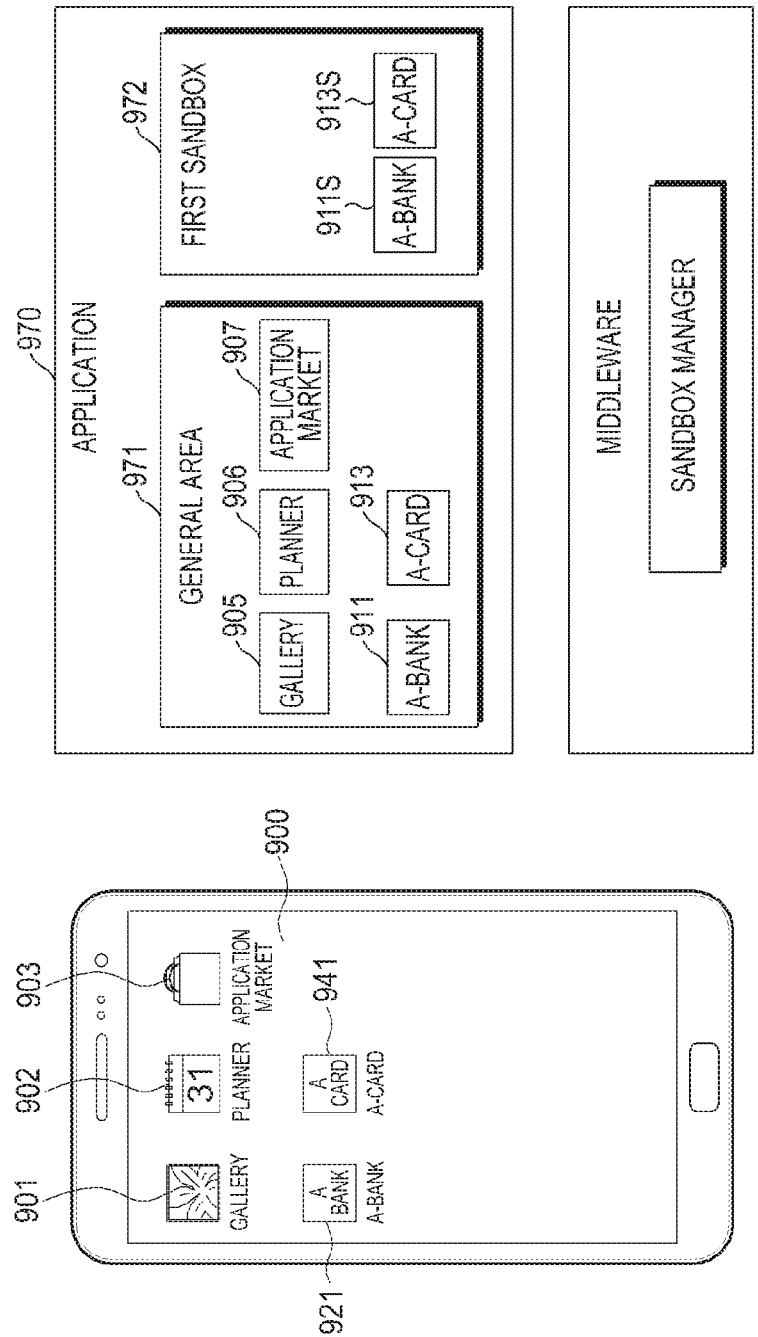

The electronic device may also download a second application related to the first application. For example, as illustrated in FIGS. 9F and 9G, the electronic device may also download an "A-card application" 913, as illustrated in FIG. 9B, related to the "A-bank application" 911. The electronic device may allocate the downloaded "A-card application" 913 to the general area 971 and "A-card application" 913S to the first sandbox 972 and display an execution icon 941 of the application 913, as illustrated in FIG. 9G.

The second application 913 may also be executed in the same sandbox 972 in which the first application is executed. Accordingly, the electronic device may install and allocate the "A-card application" 913S to the first sandbox 972.

In FIG. 9G the electronic device does not display another execution icon on the menu screen 900 for the "A-card application" 913S in the first sandbox 972. Thereafter, when the execution icon 941 is designated, the electronic device determines whether to execute the "A-card application" 913S in the first sandbox 320 or the "A-card application" 913 in the general area 971.

When the electronic device determines to execute the "A-card application" 913S in the first sandbox 320, the electronic device may not share data and code execution from the "A-card application" 913S with other applications, which are not allocated to the first sandbox 972. However, the electronic device may share the input/output data from the "A-card application" 913S with the "A-bank application" 911S.

The second application is an application related to the first application and may include, for example, an application developed by the same developer, which developed the first application, an application related to authentication or password required when the first application is executed, etc., but there is no limitation on the type. The second application is executed in the same sandbox in which the first application is executed and may be, for example, an application corresponding to the same domain identifier.

Figure 9H:
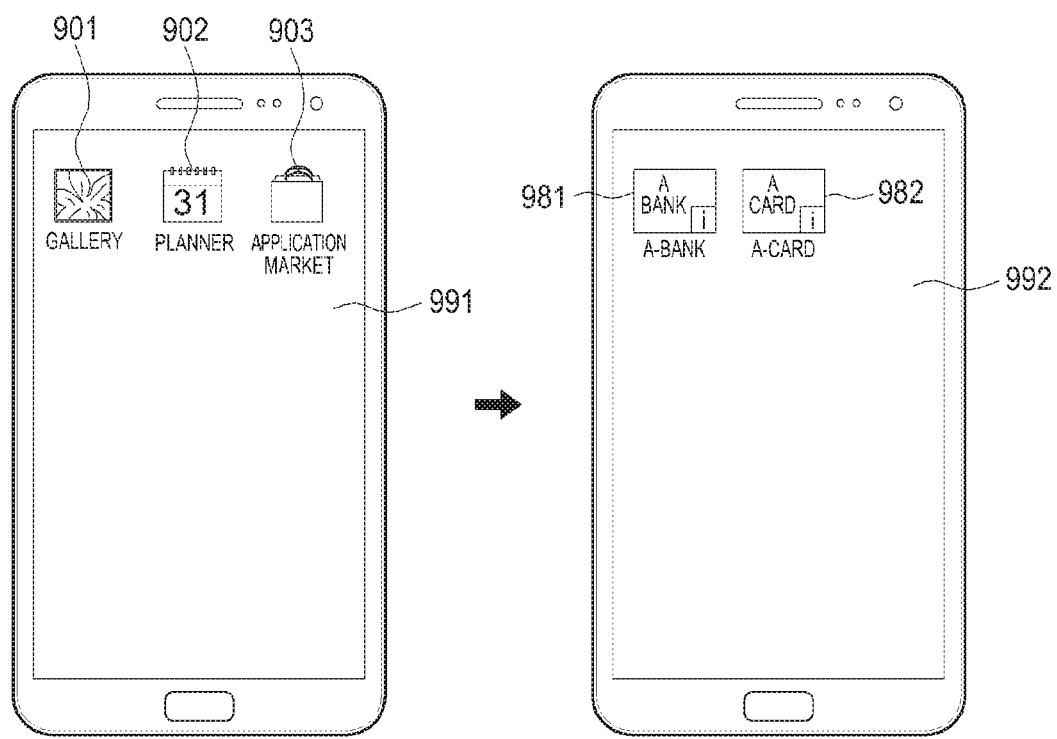

Referring to FIG. 9H, the electronic device displays a screen 991 corresponding to the general area 971, which includes the execution icons 901, 902, and 903 for applications allocated to the general area. For example, the general area 971 may correspond to a user identifier of "0", and the screen 991 may be displayed when a user having the user identifier of "0" logs in.

The sandbox may correspond to a user identifier of "200".

When a user having the user identifier of "200" logs in, the electronic device displays a screen 992 corresponding to the first sandbox.

As illustrated in FIG. 9H, the screen 992 corresponding to the first sandbox 972 includes application execution icons 981 and 982, which respectively correspond to the "A-bank application" 911S and the "A-card application" 913S allocated to the first sandbox 972. The electronic device may also display an additional identification object such as "!" next to the application execution icons 981 and 982 for the secure applications, i.e., the application allocated to the first sandbox 972, to distinguish these icons from the application execution icons 901, 902, and 903 corresponding to the general area.

As described above, the electronic device may differently display the corresponding screens 991 and 992 according to each user. Accordingly, the user may additionally input a command for the log-in with the user identifier of "200" to execute the application in the security mode.

In contrast, the electronic device may display execution icons of all applications allocated to the general area and the sandbox on a single screen as illustrated in FIG. 9G and may determine one of the general area and the sandbox area as an execution area of the application by identifying metadata. Accordingly, even though the electronic device does not receive a particular additional command from the user, the electronic device may execute the application in the sandbox.

Figure 10:
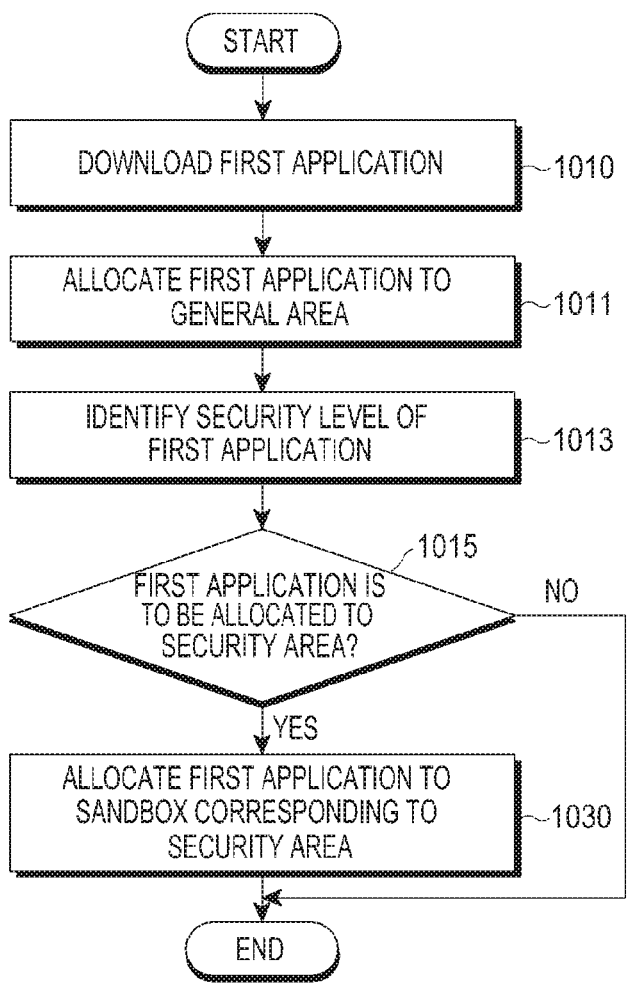
FIG. 10 is a flowchart illustrating a control method of an electronic device according to an embodiment of the present disclosure.

FIG. 10 is a flowchart illustrating a control method of an electronic device according to an embodiment of the present disclosure.

Referring to FIG. 10, the electronic device downloads and installs a first application in step 1010. According to an embodiment, the electronic device may receive a security level of the first application. For example, the electronic device may receive a first application package including the security level from an application market. The security level may be included in metadata of the first application. Alternatively, the electronic device may receive the security level separately from the first application.

In step 1011, the electronic device allocates the first application to the general area.

In step 1013, the electronic device identifies the security level of the first application. For example, the electronic device may identify the security level within the application package, the metadata, or the separately received security level.

In step 1015, the electronic device determines whether the first application is to be allocated to the security area. For example, the electronic device may determine whether the first application is to be allocated to the security area based on the identified security level. For example, the electronic device may pre-store correlation information between the security level and the sandbox. For example, the electronic device may pre-store correlation information such as that in Table 2.

TABLE 2

| Security level | Application allocation area |
|---|---|
| 0 | General area |
| 1 | General area and first sandbox |
| 2 | General area and second sandbox |

When it is determined that the first application is to be allocated to the security area in step 1015, the electronic device also allocates the first application to the sandbox corresponding to the security area in operation 1030, such that the first application is allocated to both the general area and the sandbox.

When it is determined that the first application is not to be allocated to the security area, the electronic device the method ends with the first application only being allocated to the general area.

Although the security level is expressed by Boolean values of 0, 1, and 2 in Table 2, this is only an example and there is no limitation on a security level form.

For example, if the electronic device downloads a first application and a second application, the electronic device may identify that the security level of the first application is 1 and the security level of the second application is 2. The electronic device may determine the allocation area of the first application as the general area and the first sandbox based on the correlation information between the security level and the allocation area, e.g., as in Table 2.

The electronic device may determine the allocation area of the second application as the general area and the second sandbox based on the correlation information between the security level and the allocation area.

Figure 11:
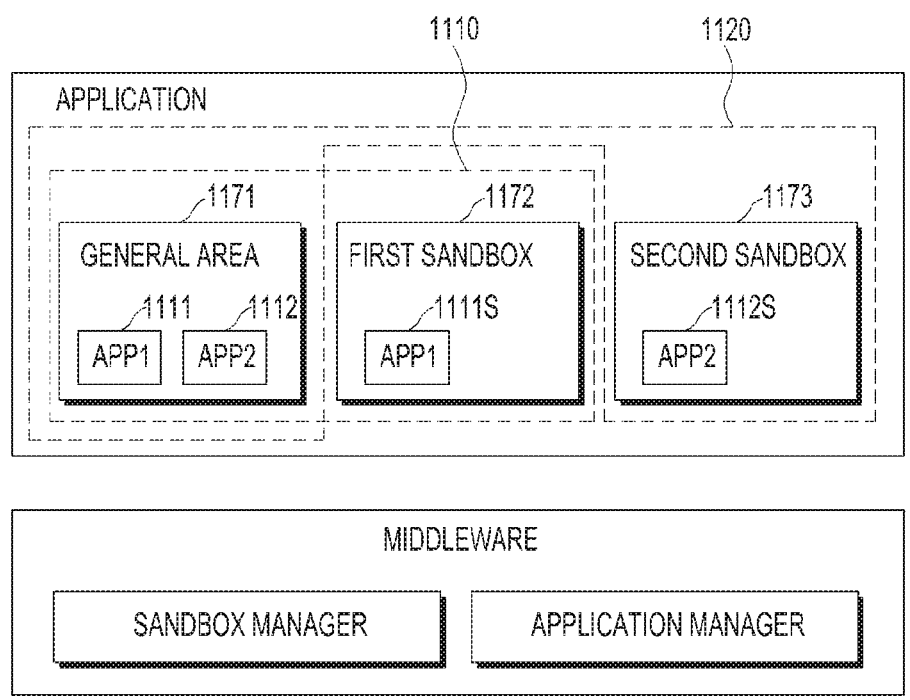
FIG. 11 illustrates a program module according to an embodiment of the present disclosure.

FIG. 11 illustrates a program module according to an embodiment of the present disclosure.

Referring to FIG. 11, the electronic device allocates a first application (APP1) to a determined area 1110, i.e., a general area 1171 and a first sandbox 1172 as 1111 and 1111S, respectively. The electronic device allocates a second application (APP2) to a determined area 1120, i.e., the general area 1170 and a second sandbox 1173 as 1112 and 1112S, respectively.

The electronic device may refrain from allocating the application to any area and first identify the security level. The electronic device may then allocate the application to at least one of the general area and the sandbox after identifying the security level.

The method of allocating the sandbox of the application according to various embodiments of the present disclosure has been described above.

As described above, various embodiments of the present disclosure may provide an electronic device, which can identify whether to allocate the application to the sandbox by identifying various pieces of metadata of the application. Accordingly, an application designer or provider, rather than a user of the electronic device or a security manager, may determine whether to allocate the application to the sandbox.

Figure 12:
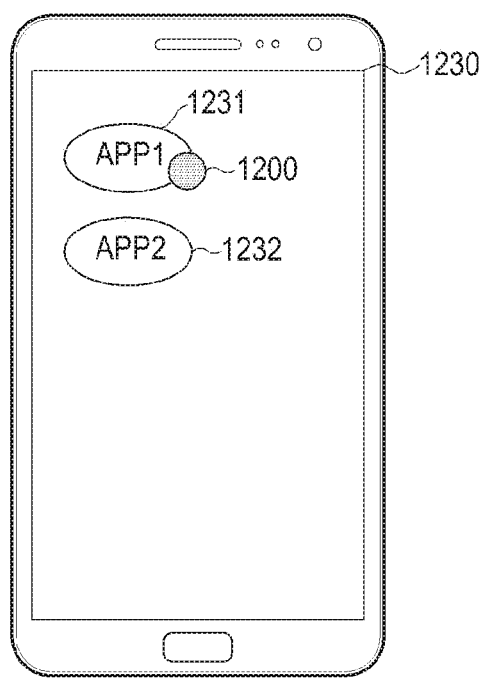
FIG. 12 illustrates execution of an application according to an embodiment of the present disclosure.

FIG. 12 illustrates execution of an application according to an embodiment of the present disclosure. In FIG. 12, it is assumed that the electronic device allocates a first application (APP1) to a general area and a first sandbox and allocates a second application (APP2) to the general area and a second sandbox. Further, it is assumed that the electronic device matches the general area to a user identifier of "0", matches the first sandbox to a user identifier of "200", and matches the second sandbox to a user identifier of "201".

Referring to FIG. 12, the electronic device displays a screen 1230 including execution icons 1231 and 1232 of all applications allocated to the general area, the first sandbox, and the second sandbox. The electronic device acquires an application execution command via a touch gesture 1200 on the execution icon 1231.

In response, the electronic device executes the first application. When a user having the user identifier of "0" logs in, the electronic device executes the first application in the general mode. That is, the electronic device executes the first application allocated to the general area, which corresponds to the user identifier of "0".

When a user having the user identifier of "200" logs in, the electronic device executes the first application in the security mode. That is, the electronic device executes the first application allocated to the first sandbox. Accordingly, even though the electronic device does not receive a particular additional command from the user, the electronic device executes the application in the sandbox.

Figure 13:
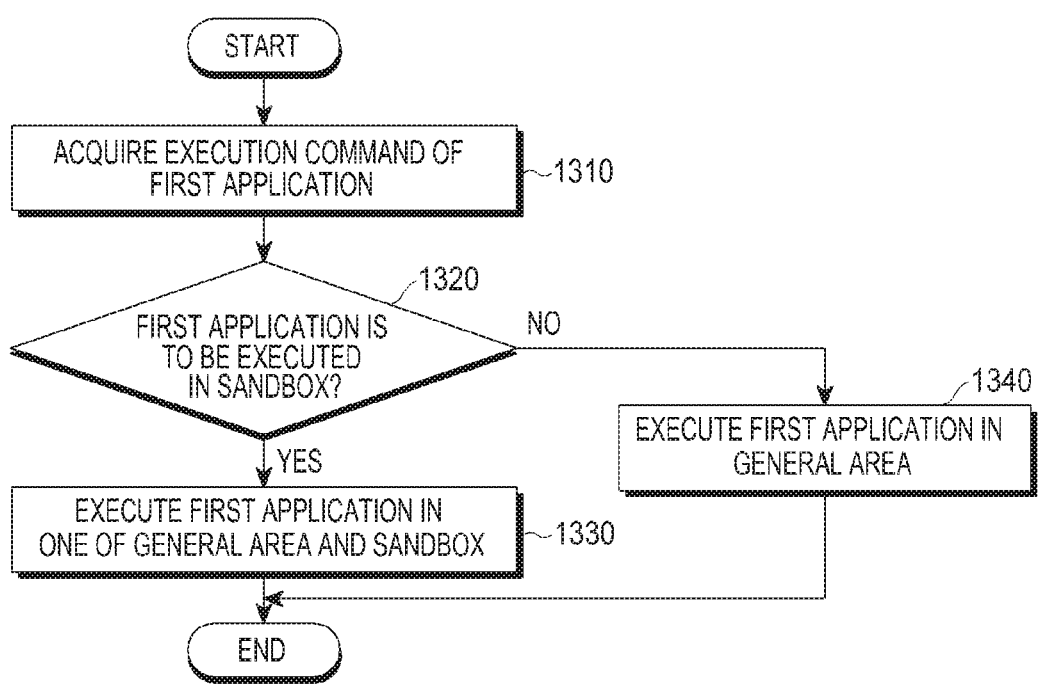
FIG. 13 is a flowchart illustrating a method of executing an application according to an embodiment of the present disclosure.

FIG. 13 is a flowchart illustrating a method of executing an application according to an embodiment of the present disclosure.

Referring to FIG. 13, in step 1310, the electronic device acquires the first application execution command. For example, as illustrated in FIG. 12, the electronic device displays a first application execution icon and acquires an application execution command through designation of the displayed execution icon, e.g., via a touch gesture.

In step 1320, the electronic device determines whether the first application is an application to be executed in the sandbox. As described above, the application may include metadata indicating whether the application is executed in the sandbox. For example, the metadata may be data directly indicating whether the application is executed in the sandbox or may be a security level.

As described above, the application may include the metadata at a time point where the application is downloaded or the electronic device may also receive the corresponding metadata when the application is downloaded. The electronic device may store the received metadata and refer to the metadata at a later execution time point.

The metadata indicating whether the application is the application allocated to the sandbox and the metadata indicating whether the application is the application executed in the sandbox may be the same as each other.

The electronic device may generate metadata at a time when the application is installed. In this case, the metadata may be included in an application package and may be generated at a time when the application is installed. The electronic device may refer to the metadata at the time of installation. In this case, the metadata indicating whether the application is the application allocated to the sandbox and the metadata indicating whether the application is the application executed in the sandbox may be different from each other.

When it is determined that the first application is the application to be executed in the sandbox in step 1320, the electronic device executes the first application in one of the general area and the sandbox in step 1330. For example, the electronic device may determine the area in which the first application is executed as one of the general area and the sandbox.

When an application is to be executed in the sandbox, the electronic device may enforce the execution of the corresponding application within the sandbox, which may be called an enforcement mode. In the enforcement mode, the electronic device may execute the application. When the sandbox has not yet been generated or the application has not yet been generated in the sandbox due to an allocation delay time, the electronic device may delay or stop the execution of the application.

Alternatively, the electronic device may inquire about the execution of the application in the general area while displaying a statement that execution of the application in the sandbox is impossible. When an execution command in the general area is acquired, the electronic device may execute the first application in the general area.

The electronic device may inquire about an execution area of the application. For example, the electronic device may display a GUI, which may determine one of the general area and the sandbox as the execution area of the first application and acquire a selection command of one of the two areas. The electronic device may execute the application in one of the general area and the sandbox according to the acquired selection command.

When it is determined that the first application is not the application to be executed in the sandbox in step 1320, the electronic device executes the first application in the general area in step 1340.

Figure 14:
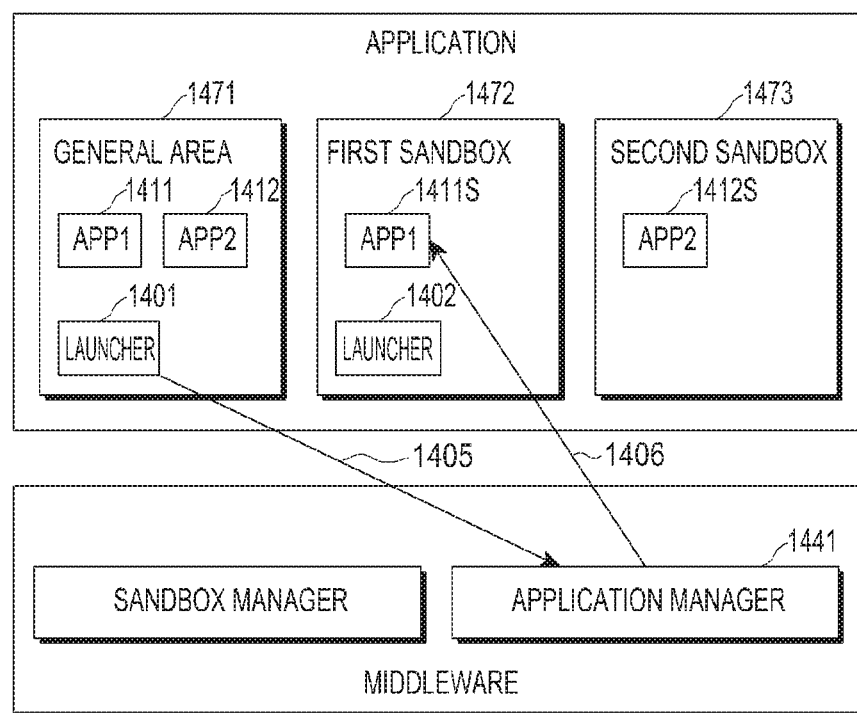
FIG. 14 illustrates a process of executing an application according to an embodiment of the present disclosure.

FIG. 14 illustrates a process of executing an application according to an embodiment of the present disclosure.

Referring to FIG. 14, a launcher application 1401 allocated to a general area 1471 may acquire an application execution command More specifically, the launcher application 1401 may display execution icons related to all the applications allocated to the general area 1471, the first sandbox 1472, and the second sandbox 1473 of the electronic device.

When an execution icon is designated, the launcher application 1401 may identify shortcut information corresponding to the execution icon. The shortcut information may include a unique value that may distinguish between applications, such as a package name of the application. The launcher application 1401 may identify information required for executing the first application (APP1) based on the identified shortcut information and output an execution request 1411 to the application manager 1441 together with the identified information.

The application manager 1441 may receive the execution request 1405 and determine whether the corresponding application is the application to be executed in the sandbox 1472.

According to an embodiment of the present disclosure, the application manager 1441 may determine whether the corresponding application is the application 1411S to be executed in the sandbox 1472 by identifying metadata of the application (APP1). For example, the application manager 1441 may further include a check module that identifies a user mode, and the check module may determine whether the corresponding application is the application to be executed in the sandbox 1472. For example, when the first application (APP1) is produced based on the Android® OS, the application manager 1441 may determine whether the corresponding application is to be executed in the sandbox 1472 according to whether particular data is included in a file of AndroidManifest.xml.

As described above, the application manager 1441 may inquire about whether to execute the first application 1411S in the sandbox 1472. The application manager 241 may inquire about whether to execute the first application 1411S in the sandbox 1472 whenever the first application (APP1) is executed or inquire about whether to execute the first application 1411S in the sandbox 1472 when the first application (APP1) is initially executed.

Alternatively, the application manager 1441 may control to execute the first application 1411S in the sandbox 1472 without any inquiry to or response from the user as indicated by reference numeral 1406.

The application manager 1441 may also refer to an authentication result when the application is executed. As described above, the electronic device may transmit an authentication request to a security server (not shown) when the application is downloaded, and receive and store an authentication result. When the application is executed, the application manager 1441 may determine whether to execute the application in the first sandbox 1472 with reference to the stored authentication result. When the application is executed, the application manager 1441 may determine to execute the application 1411 in the general area 1471 or execute the application 1411S in the sandbox 1472 or whether to execute the application or not with reference to the stored authentication result.

Figure 15:
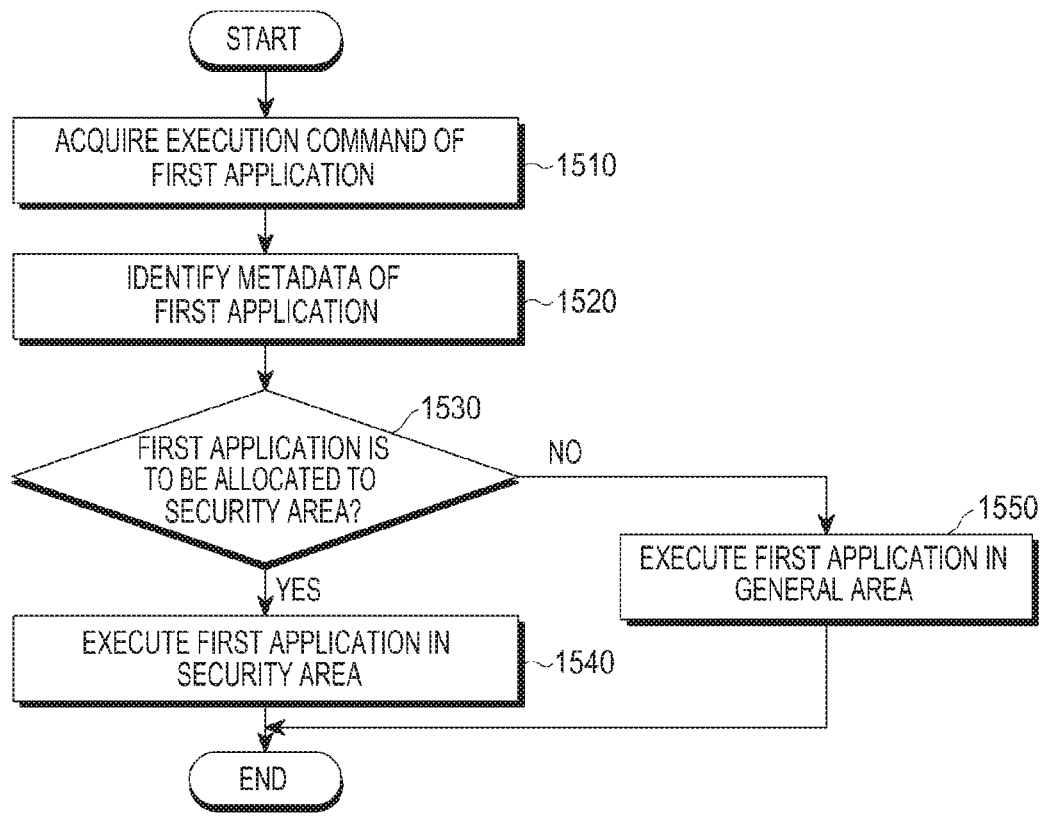
FIG. 15 is a flowchart illustrating a method of executing an application according to an embodiment of the present disclosure.

FIG. 15 is a flowchart illustrating a method of executing an application according to an embodiment of the present disclosure.

Referring to FIG. 15, in step 1510, the electronic device acquires a first application execution command.

In step 1520, the electronic device identifies metadata of the first application. For example, the first application may include metadata indicating whether the first application is executed in the sandbox or the application manager may manage the metadata corresponding to the first application. For example, the metadata may be implemented by particular data, a security level, or an authentication result.

In step 1530, the electronic device determines whether the first application is to be executed in or allocated to the security area. When it is determined that the first application is to be executed in the security area in step 1530, the electronic device executes the first application in the security area in step 1540.

However, when it is determined that the first application is not to be executed in the security area in step 1530, the electronic device executes the first application in the general area in step 1550. The electronic device may execute the first application in the security area without separate user switching. The electronic device may also execute the first application in the security area after performing a process for separate user switching.

Figure 16:
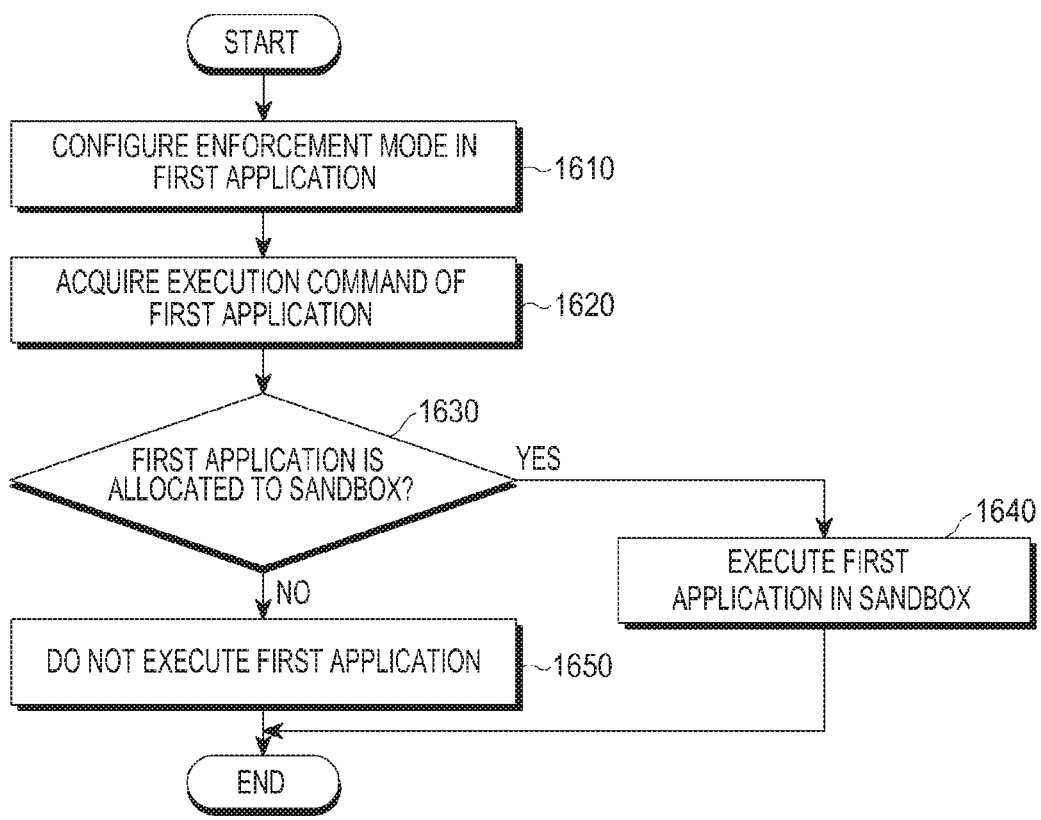
FIG. 16 is a flowchart illustrating a method of configuring an enforcement mode according to an embodiment of the present disclosure.

FIG. 16 is a flowchart illustrating a method of configuring an enforcement mode according to an embodiment of the present disclosure.

Referring to FIG. 16, the electronic device configures an enforcement mode in a first application in step 1610. As described above, the enforcement mode may be a mode for enforcing the execution of the first application only in the sandbox. For example, an application manager may configure the enforcement mode in the first application.

In step 1620, the electronic device acquires a first application execution command.

In step 1630, the electronic device determines whether the first application is allocated to the sandbox for security.

When the first application is allocated to the sandbox in step 1630, the electronic device executes the first application in the sandbox in step 1640. When the first application is not allocated to the sandbox, the electronic device does not execute the first application in step 1650.

Alternatively, the electronic device may wait for the allocation of the first application to the sandbox and execute the first application to the sandbox after the allocation.

Figure 17:
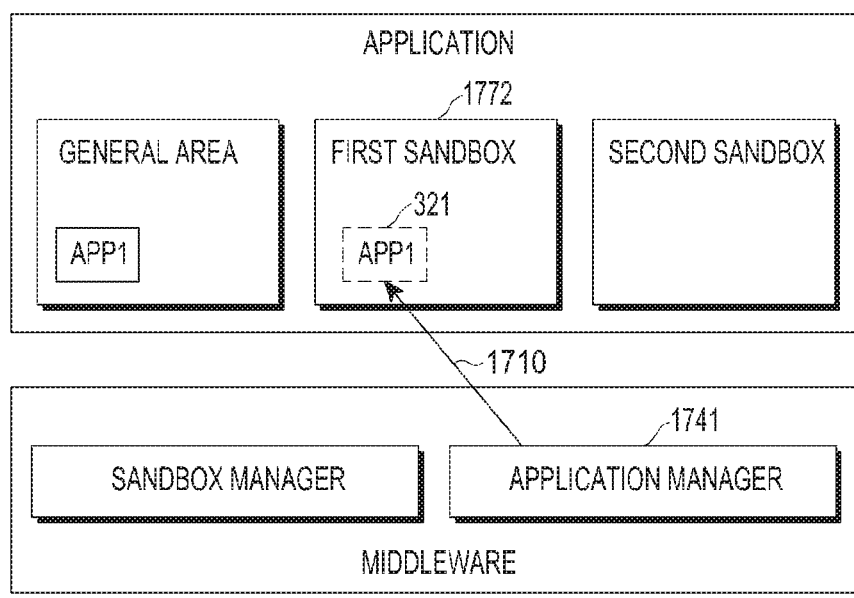
FIG. 17 illustrates a program module according to an embodiment of the present disclosure.

FIG. 17 illustrates a program module according to an embodiment of the present disclosure.

Referring to FIG. 17, an application manager 1741 may determine whether a first application (APP1) is allocated to a first sandbox 1772 as indicated by reference numeral 1710.

Figure 18:
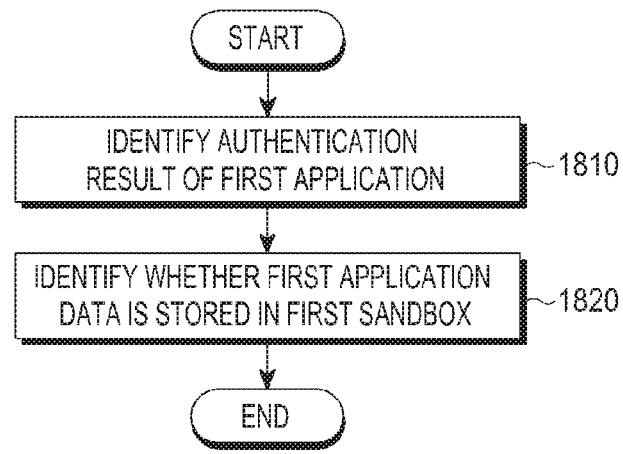
FIG. 18 is a flowchart illustrating a method of determining whether an application is allocated to a sandbox according to an embodiment of the present disclosure.

FIG. 18 is a flowchart illustrating a method of determining whether an application is allocated to a sandbox according to an embodiment of the present disclosure.

Referring to FIG. 18, the electronic device identifies an authentication result of a first application in step 1810. As described above, the electronic device may transmit an authentication request to a security server (not shown) when the application is downloaded, and receive and store an authentication result. The electronic device may determine whether the application is properly installed with reference to the stored authentication result. When the authentication result is successful, the electronic device may determine that the first application is properly installed and allocated. When the authentication result is not successful, the electronic device may determine that the first application is not allocated to the sandbox.

In step 1820, the electronic device determines whether first application data is stored in the first sandbox. For example, an application manager may determine whether the first application data is stored in resources of the electronic device corresponding to the sandbox. When it is determined that the first application data is stored in the sandbox, the electronic device may determine that the first application is allocated to the sandbox. When it is determined that the first application data is not stored in the sandbox, the electronic device may determine that the first application is not allocated to the sandbox.

Figure 19:
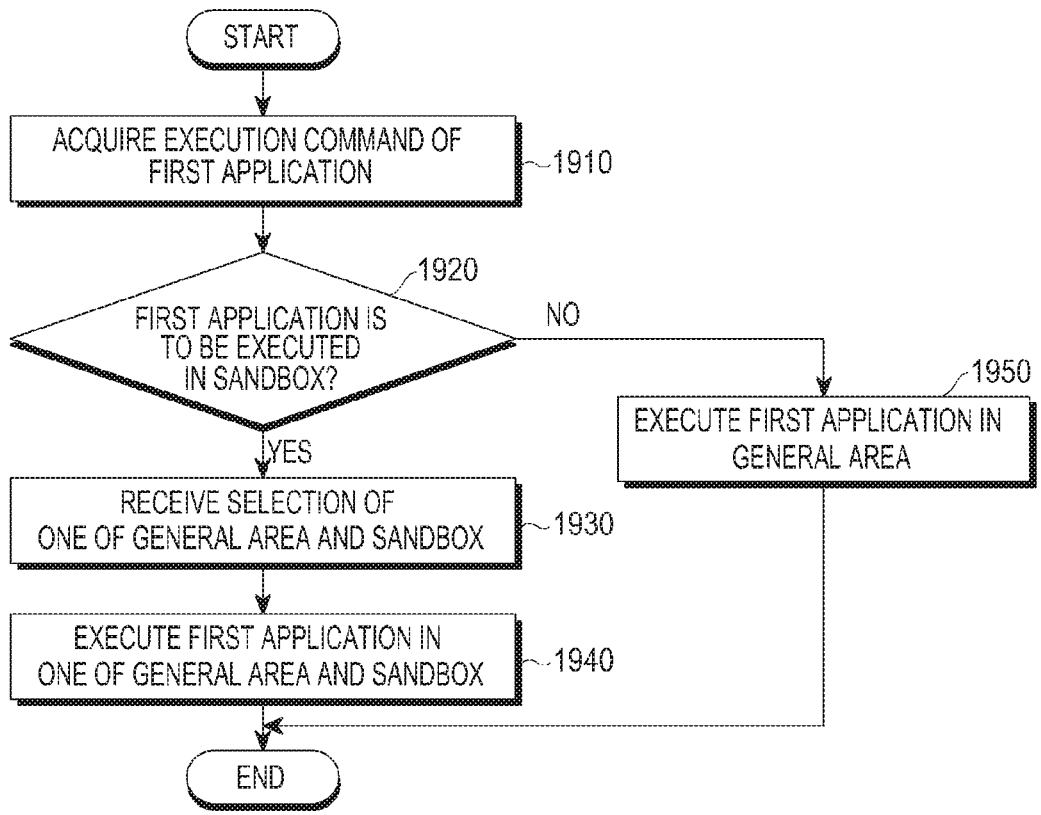
FIG. 19 is a flowchart illustrating a method of executing an application according to an embodiment of the present disclosure.
Figure 20:
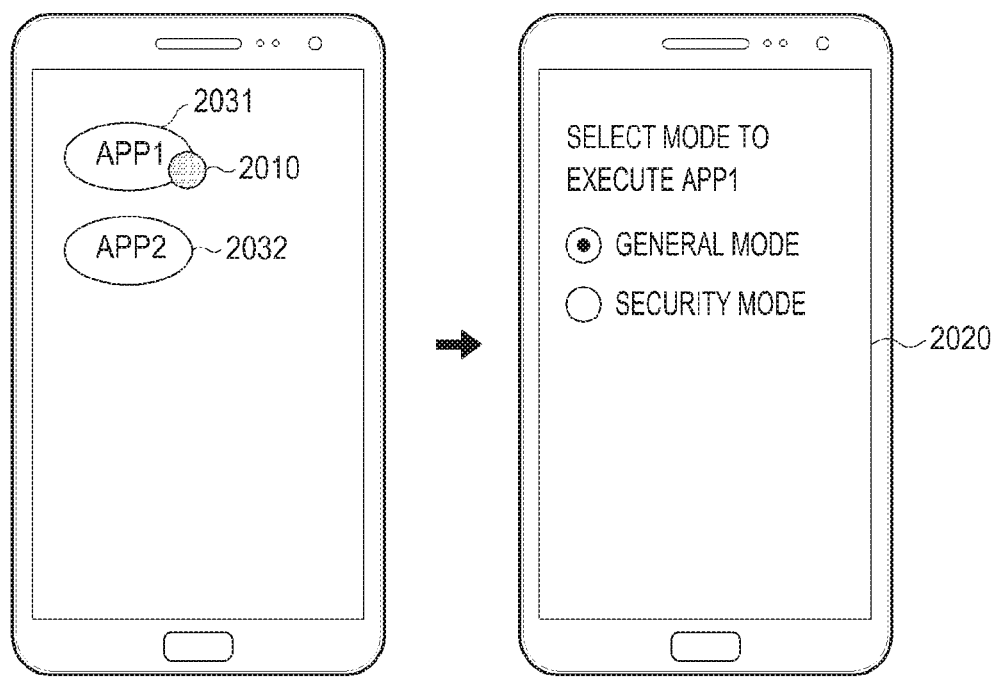
FIG. 20 illustrates a screen of an electronic device according to an embodiment of the present disclosure.

FIG. 19 is a flowchart illustrating a method of executing an application according to an embodiments of the present disclosure. FIG. 20 illustrates a screen of an electronic device according to an embodiment of the present disclosure.

Referring to FIG. 19, in step 1910, the electronic device acquires a first application execution command. For example, the electronic device may display a screen including the application execution icons 2031 and 2032 as illustrated in FIG. 20. The electronic device may acquire, for example, a touch gesture 2010 for the first application execution icon 2031.

In step 1920, the electronic device determines whether the first application is to be executed in the sandbox. For example, the electronic device may determine whether the first application is to be executed in the sandbox with reference to metadata of the first application.

When it is determined that the first application is to be executed in the sandbox in step 1920, the electronic device receives a selection of one of the general area and the sandbox in step 1930.

For example, the electronic device may display a user graphic interface 2020 as illustrated in FIG. 20. The user graphic interface 2020 according to various embodiments of the present disclosure may be a selection window for an area to execute the first application. The user graphic interface 2020 may receive a selection of one of the general mode and the security mode.

In step 1940, the electronic device executes the first application in one of the general area and the sandbox according to the acquired selection.

When it is determined that the first application is not to be executed in the sandbox, the electronic device executes the first application in the general area in step 1950.

Figure 21A:
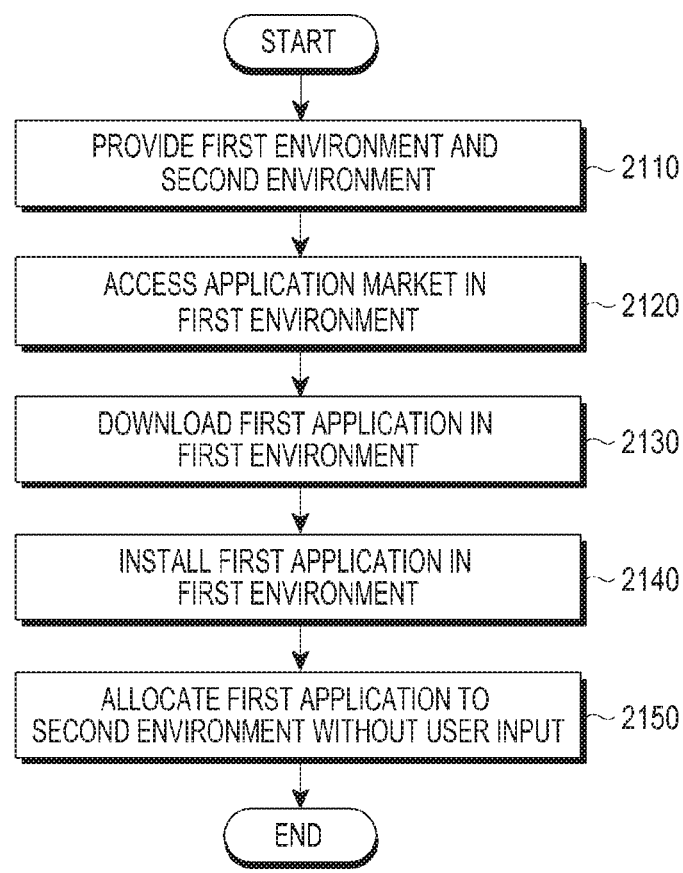
FIGS. 21A and 21B are flowcharts illustrating control methods of an electronic device according to various embodiments of the present disclosure.

FIG. 21A is a flowchart illustrating a control method of an electronic device according to an embodiment of the present disclosure.

Referring to FIG. 21A, in step 2110, the electronic device provides a first environment, e.g., a general area in which at least one application may operate, and a second environment, e.g., a sandbox having an operation environment that is partially different from the general area.

In step 2120, the electronic device accesses an application market provided by an external server through a communication module, for example, in response to a first input of the user in the first environment.

In step 2130, the electronic device downloads s selected first application from the application market and installs the downloaded first application, in response to a second input of the user in the first environment.

In step 2140, the electronic device allocates the installed first application to the first environment.

In step 2150, the electronic device allocates the installed first application to the second environment without any input of the user.

For example, the first application may include metadata indicating whether the first application is to be executed in the second environment. The electronic device may also generate the second environment, if the second environment had not already been generated in the electronic device, based on the metadata.

The metadata may include at least one of particular data, a security level of the first application, and authentication-related data for security.

The electronic device may determine whether to allocate the first application to the second environment for security according to the security level.

The electronic device may transmit an authentication request for the first application to the security server and receive an authentication result that responds to the authentication request from the security server.

The electronic device may determine whether to allocate the first application to the second environment based on the authentication result and allocate the first application to the second environment according a result of the determination on the allocation. The authentication result may include at least one of a security key for the authentication and an encoded value by the security key.

The electronic device may further include an operation for displaying execution icons for executing the applications allocated to the first environment and the second environment on a single screen. The second environment may correspond with each user identifier.

Figure 21B:
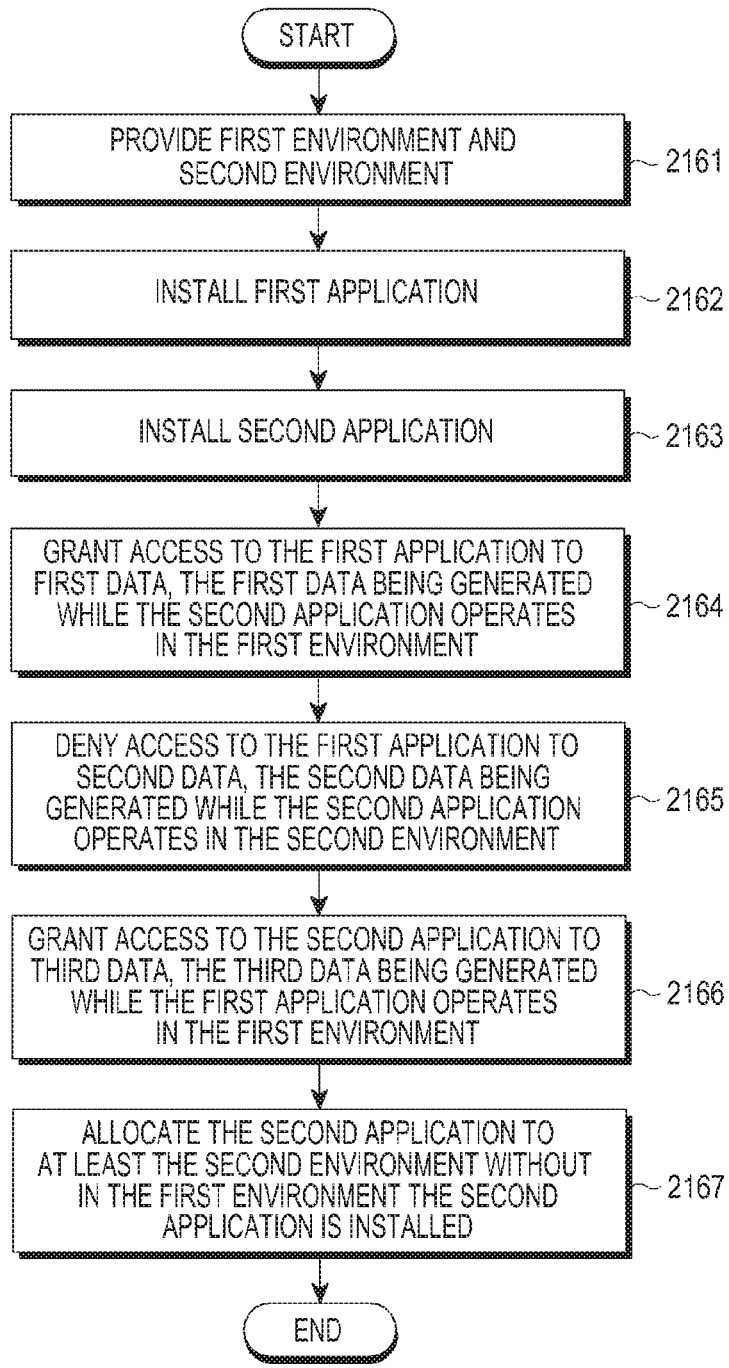

FIG. 21B is a flowchart illustrating a control method of an electronic device according to an embodiment of the present disclosure.

Referring to FIG. 21B, in step 2161, the electronic device provides a first environment in which at least one application can operate and a second environment having an operation environment at least partially different from the first environment.

In step 2162, the electronic device installs a first application operating only in a first environment.

In step 2163, the electronic device installs a second application selectively operating in at least one of the first environment and a second environment.

In step 2164, the electronic device grants access to the first application to first data, the first data being generated while the second application operates in the first environment.

In step 2165, the electronic device denies access to the first application to second data, the second data being generated while the second application operates in the second environment.

In step 2166, the electronic device grants access to the second application to third data, the third data being generated while the first application operates in the first environment.

In step 2167, the electronic device allocates the second application to at least the second environment without a user's input when the second application is installed.

Figure 22:
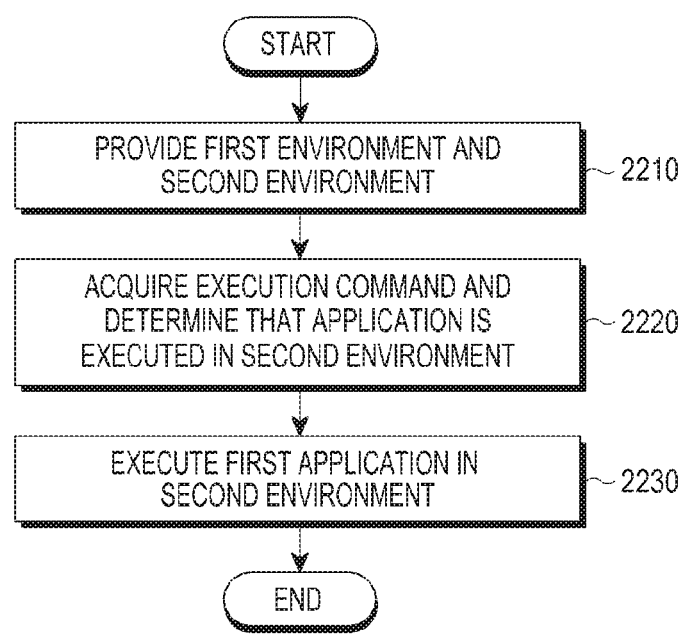
FIG. 22 is flowchart illustrating a control method of an electronic device according to an embodiment of the present disclosure.

FIG. 22 is flowchart illustrating a control method of an electronic device according to an embodiment of the present disclosure.

Referring to FIG. 22, in step 2210, the electronic device provides a first environment in which at least one application may operate and a second environment having an operation environment, which is at least partially different from the general area.

In step 2220, the electronic device acquires an execution command of a first application through the input/output interface, and determines that the first application is to be executed in the second environment.

The electronic device executes the first application in the second environment in step 2230.

The electronic device may display an execution icon of the first application and acquire designation of the displayed execution icon of the first application.

The first environment and the second environment may correspond with each piece of user identification information.

The electronic device may identify metadata, which is included in the first application and indicates whether or not the first application is executed in the second environment.

The metadata may include at least one of data inserted into the first application when the first application is manufactured, a security level of the first application, and an authentication result of the first application.

The electronic device may determine whether the first application is allocated to the second environment.

When the first application is not allocated to the second environment, the electronic device may refrain from executing the first application or may execute the first application in the first environment.

When the first application is allocated to the second environment, the electronic device may execute the first application in the second environment.

The electronic device may determine whether data of the first application is stored in the second environment.

When the electronic device receives a selection of one of the first environment and the second environment, the electronic device may execute the first application in the selected area.

Figure 23:
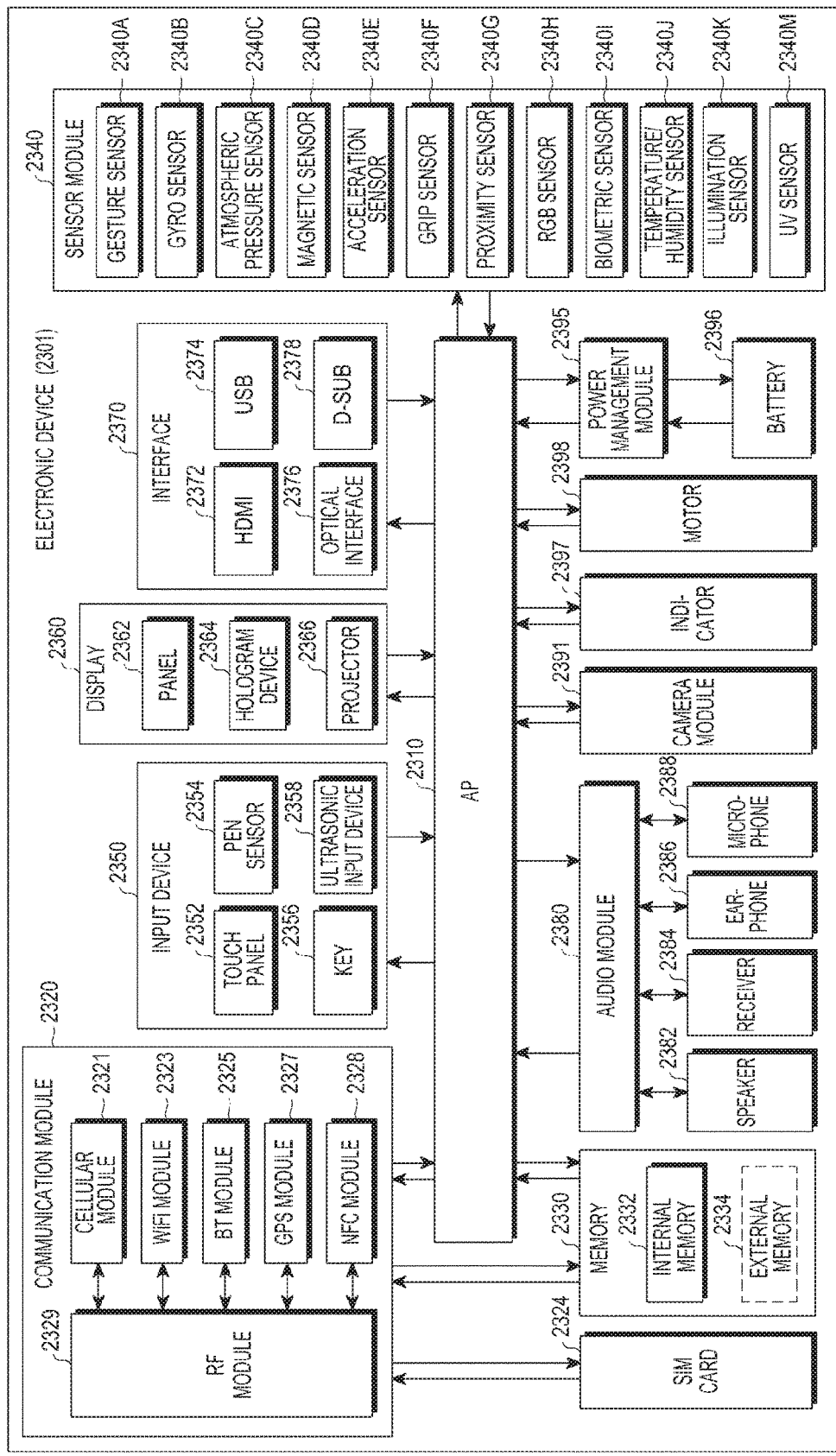
FIG. 23 illustrates an electronic device according to an embodiment of the present disclosure.

FIG. 23 illustrates an electronic device according to an embodiment of the present disclosure.

Referring to FIG. 23, the electronic device 2301 includes an AP 2310, a communication module 2320, a Subscriber Identification Module (SIM) card 2324, a memory 2330, a sensor module 2340, an input device 2350, a display 2360, an interface 2370, an audio module 2380, a camera module 2391, a power management module 2395, a battery 2396, an indicator 2397, and a motor 2398.

The AP 2310 may control a plurality of hardware or software elements connected thereto by driving an operating system or an application program and perform a variety of data processing and calculations. The AP 2310 may be implemented as, for example, a System on Chip (SoC). The AP 2310 may further include a Graphical Processing Unit (GPU) and/or an image signal processor. The AP 2310 may also include at least some of the elements illustrated in FIG. 23 (for example, a cellular module 2321). The AP 2310 may load instructions or data, received from at least one other element (for example, the memory 2330), in a volatile memory to process the loaded instructions or data, and may store various types of data in a non-volatile memory.

The communication module 2320 includes the cellular module 2321, a Wi-Fi module 2323, a BT module 2325, a GPS module 2327, an near field communication (NFC) module 2328, and a Radio Frequency (RF) module 2329.

The cellular module 2321 may provide a voice call, video call, text message services, or Internet services through, for example, a communication network. The cellular module 2321 may distinguish between and authenticate electronic devices 2301 within a communication network using a subscriber identification module (for example, the SIM card 2324). The cellular module 2321 may also perform at least some of the functions which may be provided by the AP 2310. The cellular module 2321 may include a CP.

The Wi-Fi module 2323, the BT module 2325, the GPS module 2327, and the NFC module 2328 may include, for example, a processor for processing data transmitted/received through the corresponding module. At least some (two or more) of the cellular module 2321, the Wi-Fi module 2323, the BT module 2325, the GPS module 2327, and the NFC module 2328 may also be included in one Integrated Chip (IC) or IC package.

The RF module 2329 may transmit/receive, for example, a communication signal (for example, an RF signal). The RF module 2329 may include a transceiver, a Power Amp Module (PAM), a frequency filter, a Low Noise Amplifier (LNA) or an antenna. At least one of the cellular module 2321, the Wi-Fi module 2323, the BT module 2325, the GPS module 2327, and the NFC module 2328 may transmit/receive an RF signal through a separate RF module.

The SIM card 2324 may include a subscriber identification module and/or an embedded SIM, and contain unique identification information (for example, an Integrated Circuit Card Identifier (ICCID)) or subscriber information (for example, an International Mobile Subscriber Identity (IMSI)).

The memory 2330 includes an internal memory 2332 or an external memory 2334. The internal memory 2332 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard drive, or a Solid State Drive (SSD).

The external memory 2334 may further include a flash drive, for example, a Compact Flash (CF), a Secure Digital (SD), a Micro Secure Digital (Micro-SD), a Mini Secure Digital (Mini-SD), an extreme Digital (xD), a memory stick, etc. The external memory 2334 may be functionally and/or physically connected to the electronic device 2301 through various interfaces.

The sensor module 2340 may measure a physical quantity or detect an operation state of the electronic device 2301, and may convert the measured or detected information to an electrical signal. The sensor module 2340 includes, for example, a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor (for example, red, green, and blue (RGB) sensor) 2340H, a biometric sensor 2340I, a temperature/humidity sensor 2340J, an illumination sensor 2340K, and an Ultra Violet (UV) sensor 2340M. Additionally or alternatively, the sensor module 2340 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2340 may further include a control circuit for controlling at least one sensor included therein. The electronic device 2301 may further include a processor configured to control the sensor module 2340 as a part of or separately from the AP 2310, and may control the sensor module 2340 while the AP 2310 is in a sleep state.

The input device 2350 includes, for example, a touch panel 2352, a (digital) pen sensor 2354, a key 2356, and an ultrasonic input device 2358. The touch panel 2352 may use at least one of, for example, a capacitive type, a resistive type, an infrared type, and an ultrasonic type. The touch panel 2352 may further include a control circuit. The touch panel 2352 may further include a tactile layer, and provide a tactile reaction to a user.

The (digital) pen sensor 2354 may include a recognition sheet which is a part of the touch panel or a separate recognition sheet. The key 2356 may include a physical button, an optical key or a keypad. The ultrasonic input unit 2358 may input data through an input means that generates an ultrasonic signal, and the electronic device 2301 identify data by detecting a sound wave with a microphone (for example, a microphone 2388).

The display 2360 includes a panel 2362, a hologram device 2364, and a projector 2366. The panel 2362 may be embodied to be, for example, flexible, transparent, or wearable. The panel 2362 may also be configured to be integrated with the touch panel 2352 as a single module. The hologram device 2364 may show a stereoscopic image in the air by using interference of light. The projector 2366 may project light onto a screen to display an image. For example, the screen may be located inside or outside the electronic device 2301. The display 2360 may also include a control circuit for controlling the panel 2362, the hologram device 2364, or the projector 2366.

The interface 2370 includes, for example, a High-Definition Multimedia Interface (HDMI) 2372, a Universal Serial Bus (USB) 2374, an optical interface 2376, and a D-subminiature (D-sub) 2378. Additionally or alternatively, the interface 2370 may include, for example, a Mobile High-definition Link (MHL) interface, a Secure Digital (SD) card/Multi-Media Card (MMC) interface, or an Infrared Data Association (IrDA) standard interface.

The audio module 2380 may bilaterally convert, for example, a sound and an electrical signal. The audio module 2380 may process sound information input or output through a speaker 2382, a receiver 2384, earphones 2386, the microphone 2388, etc.

The camera module 2391 is a device which may photograph a still image and a dynamic image. The camera module 291 may include one or more image sensors (for example, a front sensor or a back sensor), a lens, an Image Signal Processor (ISP) or a flash (for example, LED or xenon lamp).

The power management module 2395 may manage power of the electronic device 2301. The power management module 2395 may include a Power Management Integrated Circuit (PMIC), a charger Integrated Circuit (IC), or a battery gauge. The PMIC may have a wired and/or wireless charging scheme. Examples of the wireless charging method may include, for example, a magnetic resonance method, a magnetic induction method, an electromagnetic method, etc. Additional circuits (for example, a coil loop, a resonance circuit, a rectifier, etc.) for wireless charging may be further included. The battery gauge may measure, for example, the remaining amount of battery 2396, a charging voltage and current, or temperature. The battery 2396 may include, for example, a rechargeable battery and/or a solar battery.

The indicator 2397 may indicate a particular status of the electronic device 2301 or a part thereof (for example, the AP 2310), for example, a booting status, a message status, a charging status, or the like. The motor 2398 may convert an electrical signal into mechanical vibrations, and may generate a vibration or haptic effect. Although not illustrated, the electronic device 2301 may include a processing device (for example, a GPU) for supporting mobile TV. The processing device for supporting mobile TV may process media data according to a standard of Digital Multimedia Broadcasting (DMB), Digital Video Broadcasting (DVB), media flow, etc.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Herein, the term "module" may mean a unit including one of hardware, software, and firmware or a combination of two or more of them. The term "module" may be interchangeably used with, for example, the term "unit", "logic", "logical block", "component", or "circuit". The term "module" may be the smallest unit of an integrated component or a part thereof. The term "module" may be the smallest unit that performs one or more functions or a part thereof. The term "module" may be mechanically or electronically implemented. For example, the term "module" may include at least one of an Application-Specific Integrated Circuit (ASIC) chip, a Field-Programmable Gate Arrays (FPGA), and a programmable-logic device for performing operations which has been known or are to be developed hereinafter.

At least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:
1. An electronic device comprising:
a touch screen;
a communication module;
a processor configured to provide a first environment and
   a second environment having an operation environment at least partially different from the first environment; and a memory that stores instructions, which when executed, instruct the processor to:
  download, through the communication module, a first application from an external device,
  identify metadata of the first application, wherein the metadata indicates that the first application is to be stored in the second environment,
  in response to identifying that the metadata of the first application is to be stored in the second environment, transmit, to a security server, an authentication request regarding the first application through the communication module,
  receive, from the security server, an authentication result corresponding to the authentication request regarding the first application, through the communication module,
  control the touch screen to receive an execution command of the first application,
  based on the received execution command of the first application, identify whether the first application is to be executed in the second environment based on a determination of whether the first application is authenticated based on the authentication result and stored in the second environment, and
  execute the first application in the second environment, based on identification that the first application is to be executed in the second environment.

2. The electronic device of claim 1, further comprising a display that displays an execution icon of the first application, wherein the input/output interface acquires a designation of the displayed execution icon of the first application.

3. The electronic device of claim 1, wherein each of the first environment and the second embodiment correspond to respective user identification information.

4. The electronic device of claim 1, wherein the metadata includes at least one of data inserted into the first application when the first application is produced, a security level of the first application, and an authentication result of the first application.

5. The electronic device of claim 1, wherein, when the first application is not installed in the second environment, the processor does not execute the first application or executes the first application in the first environment.

6. The electronic device of claim 1, wherein, when the first application is installed in the second environment, the processor executes the first application in the second environment.

7. The electronic device of claim 1, wherein the processor receives a selection of one of the first environment and the second environment and executes the first application in the selected environment.

8. The electronic device of claim 1, wherein an icon corresponding to the first application executed in the second environment is arranged on a screen corresponding to the first environment.

9. A control method of an electronic device, the control method comprising:
  providing a first environment in which at least one application can operate and a second environment having an operation environment at least partially different from the first environment; downloading, through a communication module, a first application from an external device,
  identifying metadata of the first application, wherein the metadata indicates that the first application is to be stored in the second environment,
  in response to identifying that the metadata of the first application is to be stored in the second environment, transmitting, to a security server, an authentication request regarding the first application through the communication module,
  receiving, from the security server, an authentication result corresponding to the authentication request regarding the first application, through the communication module,
  controlling a touch screen of the electronic device to receive an execution command of the first application,
  based on the received execution command of the first application, identifying whether a first application among the at least one application is to be executed in the second environment based on an identification of whether the first application is authenticated and stored in the second environment; and
  executing the first application in the second environment, based on identification that the first application is to be executed in the second environment.

10. The control method of claim 9, further comprising:
  displaying an execution icon of the first application; and
  acquiring a selection of the displayed execution icon of the first application.

11. The control method of claim 9, wherein each of the first environment and the second embodiment correspond to respective user identification information.

12. The control method of claim 9, wherein the metadata includes at least one of data inserted into the first application when the first application is produced, a security level of the first application, and an authentication result of the first application.

13. The control method of claim 12, further comprising, when the first application is not installed in the second environment, not executing the first application or executing the first application in the first environment.

14. The control method of claim 12, further comprising, when the first application is installed in the second environment, executing the first application in the second environment.

15. The control method of claim 9, further comprising:
  receiving a selection of one of the first environment and the second environment; and
  executing the first application in the selected environment.

16. The control method of claim 9, further comprising arranging and displaying an icon corresponding to the first application executed in the second environment on a screen corresponding to the first environment.

* * * * *